(12) United States Patent
Sanders et al.

(10) Patent No.: US 11,976,140 B2
(45) Date of Patent: May 7, 2024

(54) IN-LINE TRIMMING OF DRY CATALYST FEED

(71) Applicant: ExxonMobil Chemical Patents Inc., Baytown, TX (US)

(72) Inventors: David F Sanders, Beaumont, TX (US); Matthew W. Holtcamp, Huffman, TX (US); Kevin A. Stevens, Houston, TX (US); Joshua P Olson, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 483 days.

(21) Appl. No.: 17/279,708

(22) PCT Filed: Oct. 30, 2019

(86) PCT No.: PCT/US2019/058886
§ 371 (c)(1),
(2) Date: Mar. 25, 2021

(87) PCT Pub. No.: WO2020/092584
PCT Pub. Date: May 7, 2020

(65) Prior Publication Data
US 2021/0395404 A1     Dec. 23, 2021

Related U.S. Application Data

(60) Provisional application No. 62/754,217, filed on Nov. 1, 2018.

(51) Int. Cl.
*C08F 210/16*     (2006.01)
*B01J 8/00*      (2006.01)
(Continued)

(52) U.S. Cl.
CPC ............... *C08F 10/02* (2013.01); *B01J 8/004* (2013.01); *B01J 8/22* (2013.01); *C08F 2/01* (2013.01);
(Continued)

(58) Field of Classification Search
CPC ...... C08F 210/16; C08F 210/06; C08F 10/02; C08F 2/01; C08F 2/34
See application file for complete search history.

(56) References Cited

U.S. PATENT DOCUMENTS

| 5,082,634 A | 1/1992 | Raufast |
| 5,453,471 A | 9/1995 | Bernier et al. |

(Continued)

FOREIGN PATENT DOCUMENTS

| EP | 0549252 | 6/1993 |
| WO | 1996-0009328 | 1/1996 |

(Continued)

OTHER PUBLICATIONS

Namkajorn, M. et al (2016) "Condensed Mode Cooling for Ethylene Polymerization: Part III. The Impact of Induced Condensing Agents on Particle Morphology and Polymer Properties", Macromolecular Chemistry and Physics 2016, vol. 217, pp. 1521-1528.

*Primary Examiner* — Rip A Lee
(74) *Attorney, Agent, or Firm* — ExxonMobil Technology and Engineering Company-Chemicals

(57) ABSTRACT

A process for polymerizing polyethylene is disclosed. The process comprises contacting ethylene and at least one comonomer with a catalyst system to produce a polyolefin. The first catalyst and at least a portion of the second catalyst are co-supported to form a commonly-supported catalyst system. The catalyst system is introduced to a line as a dry-feed. The line is coupled with a polymerization reactor.

(Continued)

A carrier fluid is added to the line to form a slurry. The slurry is introduced to the polymerization reactor.

20 Claims, 2 Drawing Sheets

(51) Int. Cl.
- *B01J 8/22* (2006.01)
- *C08F 2/01* (2006.01)
- *C08F 4/659* (2006.01)
- *C08F 4/6592* (2006.01)
- *C08F 10/02* (2006.01)

(52) U.S. Cl.
CPC ...... *C08F 4/65925* (2013.01); *C08F 4/65927* (2013.01); *C08F 210/16* (2013.01); *B01J 2208/00548* (2013.01); *B01J 2208/00787* (2013.01); *B01J 2208/00849* (2013.01)

(56) References Cited

U.S. PATENT DOCUMENTS

| | | | |
|---|---|---|---|
| 6,319,995 B2 | 11/2001 | Glenn et al. | |
| 6,391,985 B1 | 5/2002 | Goode et al. | |
| 6,605,675 B2 * | 8/2003 | Mawson | B01J 4/002 |
| | | | 526/171 |
| 6,608,149 B2 | 8/2003 | Mawson et al. | |
| 6,689,847 B2 | 2/2004 | Mawson et al. | |
| 6,747,103 B1 | 6/2004 | Vestberg et al. | |
| 6,825,287 B2 | 11/2004 | Mawson et al. | |
| 6,908,971 B2 | 6/2005 | Burns et al. | |
| 6,956,089 B2 | 10/2005 | Mawson et al. | |
| 7,803,324 B2 | 9/2010 | Burns et al. | |
| 7,973,112 B2 | 7/2011 | Muruganandam et al. | |
| 7,980,264 B2 | 7/2011 | Lynn | |
| 7,989,562 B2 | 8/2011 | Terry et al. | |
| 8,962,775 B2 | 2/2015 | Hoang et al. | |
| 9,809,667 B2 * | 11/2017 | Lue | C07F 17/00 |
| 9,850,332 B2 * | 12/2017 | Lue | C08F 210/02 |
| 9,879,106 B2 | 1/2018 | Rix et al. | |
| 9,902,790 B2 | 2/2018 | Vanderlende et al. | |
| 10,308,742 B2 * | 6/2019 | Lue | B32B 27/32 |
| 10,618,989 B2 | 4/2020 | Doufas et al. | |
| 10,899,860 B2 * | 1/2021 | Silva | C08F 210/16 |
| 10,913,808 B2 | 2/2021 | Holtcamp et al. | |
| 2010/0010179 A1 | 1/2010 | Muruganandam et al. | |
| 2010/0041841 A1 | 2/2010 | Terry et al. | |
| 2011/0275772 A1 * | 11/2011 | Savatsky | C08F 10/00 |
| | | | 526/118 |
| 2016/0347874 A1 * | 12/2016 | Boller | C08F 2/34 |
| 2017/0129977 A1 | 5/2017 | Martin et al. | |
| 2017/0137551 A1 | 5/2017 | Pequeno et al. | |
| 2017/0362353 A1 | 12/2017 | Savatsky et al. | |
| 2018/0100031 A1 | 4/2018 | Savatsky et al. | |
| 2018/0155473 A1 | 6/2018 | Kuhlman | |
| 2018/0155474 A1 | 6/2018 | Holtcamp et al. | |
| 2018/0237554 A1 | 8/2018 | Holtcamp et al. | |
| 2018/0298128 A1 * | 10/2018 | Harlan | C08F 210/16 |
| 2019/0092886 A1 | 3/2019 | Savatsky et al. | |
| 2019/0119413 A1 | 4/2019 | Holtcamp et al. | |
| 2019/0256629 A1 | 8/2019 | Chandak et al. | |
| 2019/0284310 A1 | 9/2019 | Pannell et al. | |
| 2020/0071436 A1 * | 3/2020 | Silva | C08F 210/16 |
| 2021/0395400 A1 * | 12/2021 | Sanders | C08F 4/65925 |
| 2022/0033536 A1 * | 2/2022 | Stevens | C08F 210/16 |
| 2022/0033537 A1 * | 2/2022 | Stevens | C08F 4/65927 |

FOREIGN PATENT DOCUMENTS

| | | |
|---|---|---|
| WO | 2019-046085 | 3/2019 |
| WO | 2019-241045 | 12/2019 |

* cited by examiner

IN-LINE TRIMMING OF DRY CATALYST FEED

CROSS-REFERENCE OF RELATED APPLICATIONS

This application is a National Phase Application claiming priority to PCT Application Serial No. PCT/US2019/058886, filed Oct. 30, 2019, which claims the benefit of Ser. No. 62/754,217, filed Nov. 1, 2018, the disclosures of which are hereby incorporated in it their entirety.

FIELD

The present disclosure relates to an in-line trim process of a dry-feed catalyst for producing polyolefins and olefin copolymers comprising polymerizing olefin by using mixed catalyst systems with properties tunable in gas-phase fluidized bed polymerization reactors.

BACKGROUND

Olefin polymerization catalysts are of great use in industry. Hence, there is an interest in finding new catalyst systems and polymerization processes that increase the commercial usefulness of the catalyst and allow the production of polymers having improved properties. Within the field of polymer synthesis, the ability to accurately modulate polymer composition and architecture is an abiding goal.

Polyolefins are widely used commercially because of their robust physical properties. Polyolefins are commonly prepared with a catalyst that polymerizes olefin monomers. Therefore, there is interest in finding new catalysts and catalyst systems that provide polymers having improved properties.

For instance, various types of alpha-olefins including high density, low density, and linear low density polyethylenes, are some of the most commercially advantageous, such as propylene alpha-olefins (otherwise known as polypropylenes) and ethylene alpha-olefins (otherwise known as polyethylenes). Polyethylene and polypropylene are two of the top polymer resins used in the world today and are typically produced in a low pressure reactor, utilizing, for example, solution, slurry, or gas phase polymerization processes. Polymerization takes place in the presence of catalyst systems such as those employing, for example, a Ziegler-Natta catalyst, a metallocene catalyst, or combinations thereof.

Polyethylene and polypropylene can be tailored to achieve a wide range of mechanical and chemical properties, enabling their use in various applications such as agricultural films, garments, tapes, stretch films, retail bags, bottles, containers, pipes, to name a few. The selection of a polyolefin for a particular application depends on the resin's type and grade, which are determined by the manufacturing technology or process, the catalyst, and the raw feedstock used in production. Sequentially, the polyolefin grade is determined by properties such as molecular weight (Mw), molecular weight distribution (MWD), density, branching and crystallinity that affect how and where each polyolefin resin is used. Additionally, the composition distribution is known to influence the properties of copolymers, such as stiffness, toughness, extractable content, environmental stress crack resistance, and heat sealing, among other properties. The composition distribution of a polyolefin may be readily measured by methods known in the art, for example, Temperature Raising Elution Fractionation (TREF) or Crystallization Analysis Fractionation (CRYSTAF).

Gas-phase polymerization processes are today among the preferred processes for polymerizing ethylenically unsaturated monomers, in particular for the polymerization of ethylene, if desired in the presence of further unsaturated monomers. Polymerization processes in fluidized beds are moreover particularly economical.

One bottleneck in the manufacture of solid polyethylene by these methods is the occurrence of gels in the polymer and/or reactor. Indeed, excessive crosslinking can occur during the polymerization and produce insoluble gel formation. Such defects can affect the quality, aesthetics and performance of the articles manufactured from the resins. These gels, which vary in character from small hard particles to large soft particles and are considered to be composed of high molecular weight, cross-linked molecules, form bubble-like inclusions in polyethylene film that are referred to as fisheyes or lenses, depending on their size, and are hereinafter referred to as fisheyes. The presence of fisheyes can be undesirable in extruded film, which presently comprises the major use of high pressure polyethylene, because the fisheyes detract from the appearance of the film and also because the gels from which they are formed can cause extrusion difficulties, most notably with tubular extruded film. Fisheyes can also detract from the appearance of molded and extruded polyethylene articles and are particularly troublesome with polyethylene intended for use in wire and cable coatings that will be exposed to sunlight.

Production of a desired polymer product can include use of a supported catalyst system having a ratio of catalysts on the support. This ratio can vary due to several factors including reactor poisons, aging, batch to batch variability. Catalyst ratio can be tuned by use of "trim" technology. Trimming involves reacting the supported catalyst with a solution containing one of the catalysts to adjust the supported catalyst ratio. Trim systems can involve a catalyst slurry that is in contact with a hydrocarbon (typically $iC_5$ or mineral oil (MO)) solution. However, this method would involve an additional component in the reactor (the slurry) and introduction of slurry feed commercial sites. This method would also involve use of large amounts of solvent, which may be deemed uneconomical.

There is a need for polymerization processes that allow for on-line adjustment of trim rates and other process conditions in order to form low density polyolefins.

References for citing in an Information Disclosure Statement (37 CFR 1.97(h)) include: EP-A-0202 076; EP-A-0549 252; EP-A-0697 421; U.S. Pub. No. 2016/0347874; U.S. Pub. No. 2010-0041841; U.S. Pat. Nos. 6,825,287; 6,689,847; 6,608,149; 6,605,675; 7,980,264; 7,973,112

SUMMARY

The present disclosure relates to processes for polymerizing olefin(s) using dual catalyst systems. In particular, methods include combining a catalyst component dry-feed with a catalyst component solution to form a slurry catalyst composition and introducing the slurry catalyst composition into a polymerization reactor.

In at least one embodiment, a method for producing a polyolefin includes contacting a dry-feed composition and a solution composition in a line to form a slurry composition. The dry-feed composition includes a contact product of a first catalyst, a second catalyst, a support, and a first activator, and the solution composition includes a contact product of an activator, a diluent, and the first catalyst or the second catalyst. The method includes introducing a carrier gas to the line, introducing the slurry composition from the line into a gas-phase fluidized bed reactor, exposing the slurry composition to polymerization conditions, and obtaining a polyolefin.

DETAILED DESCRIPTION

Figure 1:
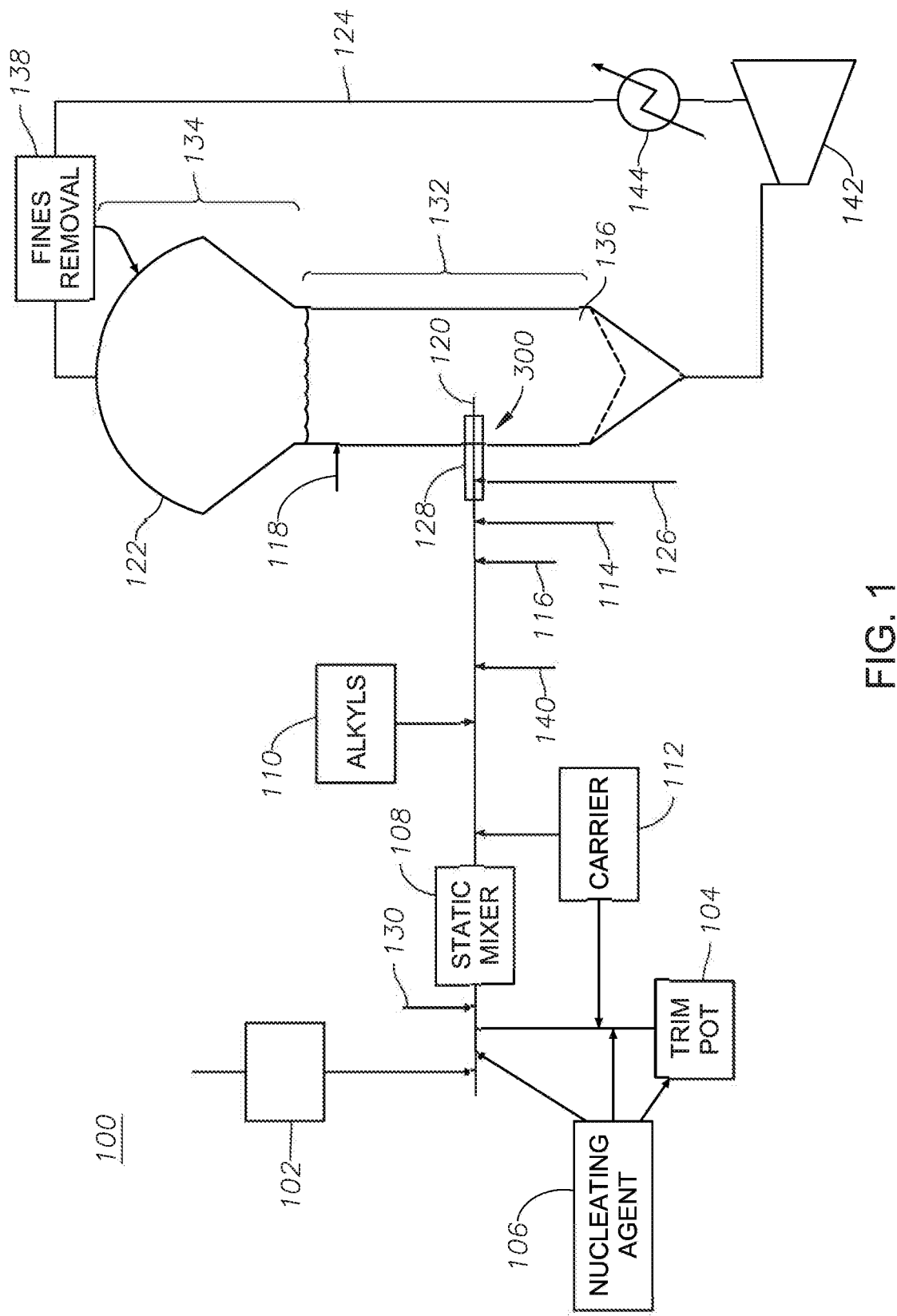
FIG. 1 is a schematic of a gas-phase reactor system, according to one embodiment.

The present disclosure provides a variety of polymers that can be made in gas phase polymerization processes using a process to provide catalyst ratio modification "in-line" of the reactor using a dry catalyst feed. Modification of the current dry-feed system by only changing inputs downstream of the feeder, with upstream modifications being merely optional, offers a new and improved approach to trim technology.

Two distinctive process sections can be identified in polyolefin production, a wet-end and a dry-end process. Feeding and precisely calibrating a fluid (e.g., catalyst slurry) is simpler than attempting to convey a solid catalyst stream into a polymerization reactor at high differential pressure with precision control of feed rates. Thus, a solid catalyst feeder is more complicated in design and maintenance. However, methods of the present disclosure can provide a more efficient and economically attractive way to access a polyolefin polymer without having to use carrier in a slurry pot.

Methods of the present disclosure can involve feeding a hydrocarbon (e.g. $iC_5$) containing a dissolved metallocene in a feed probe with a dry catalyst. Without being bound by theory, the metallocene, upon contact, becomes supported and alters the supported catalyst ratio. These mixed catalyst systems give additional control over, for example, weight average molecular weight (Mw) and composition distributions (CD) which allow the production of high performance products. The method uses a supported dry mixed-catalyst system, an activator, a mixture of $N_2$, a hydrocarbon carrier, and a trim solution (metallocenes) in the reactor polymerization process, creating an "in-line" slurry. Embodiments of the catalyst system, support, activator, catalyst precursor compound, and co-activator are described in more detail below.

The present disclosure further relates to a modification of a dry-feed system that provides for trim technology by only changing inputs downstream of the feeder. This set-up can allow for catalyst preparation and handling to remain unchanged. The catalyst modification can be accomplished by adding carrier (e.g., $iC_5$) and trim solution into a catalyst line where an inert gas, such as $N_2$, is provided to the line at a pressure. Accordingly, the mixture of inert gas (e.g., $N_2$), carrier (e.g., $iC_5$), metallocene solution, and supported catalyst creates an "in-line slurry". The amount of carrier (e.g., $iC_5$) can be varied. In at least one embodiment, sufficient carrier is present to contact the supported catalyst evenly, thus providing a good distribution of the trim solution. Formation of this "in-line slurry" allows for on-line modification of the supported catalyst to produce the desired products.

The present disclosure provides processes for producing polyethylene and ethylene copolymers comprising polymerizing ethylene by using mixed catalyst systems with tunable properties.

Catalyst pairs or multi-catalyst mixtures can produce polymers having a molecular weight and composition distribution depending on the catalyst's response to the reactor conditions and reactor components. Such response can be influenced by, for example, trimming a second catalyst.

Melt Index (MI), for example, is indicative of a polymer's molecular weight and the Melt Index Ratio (MIR) is indicative of the molecular weight distribution. A polymer that exhibits a higher MI has a shorter polymer chain length. As MIR increases, the molecular weight distribution (MWD) of the polymer broadens. A polymer that exhibits a narrower molecular weight distribution has a lower MIR.

MIR is High Load Melt Index (HLMI) divided by MI as determined by ASTM D1238. MI, also referred to as $I_2$, reported in g/10 min, is determined according to ASTM D1238, 190° C., 2.16 kg load. HLMI, also referred to as $I_{21}$, reported in g/10 min is determined according to ASTM D1238, 190° C., 21.6 kg load.

The present disclosure provides processes for forming polyethylene including polymerizing ethylene in the presence of a catalyst system in a reactor, where the catalyst system includes a first catalyst and a second catalyst. The techniques include adjusting reactor conditions, such as an amount of second catalyst fed to the reactor to control MI, density, and MIR of the polyethylene.

In at least one embodiment, by extending this concept to mixed catalyst systems, the MIR can be adjusted by changing the catalyst concentration and or ratio in the reactor. By adding an additional catalyst system, the change in MI of each independent system results in a change in the breadth of the molecular weight distribution. Changing this breadth affects the MIR of the final product and may be used to tune the product properties.

As used herein, Mn is number average molecular weight, Mw is weight average molecular weight, and Mz is z average molecular weight, wt % is weight percent, and mol % is mole percent. Unless otherwise noted, all average molecular weights (e.g., Mw, Mn, Mz) are reported in units of g/mol. The MWD, also referred to as polydispersity index (PDI), is defined to be Mw divided by Mn.

Unless otherwise indicated, "catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1}hr^{-1}$. Unless otherwise indicated, "catalyst activity" is a measure of how active the catalyst is and is reported as the mass of product polymer (P) produced per mole of catalyst (cat) used (kgP/molcat) or as the mass of product polymer (P) produced per mass of catalyst (cat) used (gP/gcat). Unless otherwise indicated, "conversion" is the amount of monomer that is converted to polymer product, and is reported as mol % and is calculated based on the polymer yield and the amount of monomer fed into the reactor.

In at least one embodiment, according to the present disclosure, a catalyst system comprises a catalytic activity of greater than 5000 gP/gCat, such as greater than 6000 gP/gCat, such as greater than 7000 gP/gCat.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of the present disclosure, ethylene shall be considered an α-olefin.

For purposes of the present disclosure and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

Unless otherwise indicated, room temperature is 23° C.

"Different" or "not the same" as used to refer to R groups in any formula herein (e.g., $R^2$ and $R^8$ or $R^4$ and $R^{10}$) or any substituent herein indicates that the groups or substituents differ from each other by at least one atom or are different isomerically.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane.

A "catalyst system" is a combination of at least two catalyst compounds, an optional activator, an optional co-activator, and an optional support material. For the purposes of the present disclosure, when catalyst systems are described as comprising neutral stable forms of the components, it is well understood by one of ordinary skill in the art, that the ionic form of the component is the form that reacts with the monomers to produce polymers. Catalyst systems, catalysts, and activators of the present disclosure are intended to embrace ionic forms in addition to the neutral forms of the compounds/components.

A metallocene catalyst is an organometallic compound with at least one π-bound cyclopentadienyl moiety (or substituted cyclopentadienyl moiety) and more frequently two π-bound cyclopentadienyl moieties or substituted cyclopentadienyl moieties bonded to a transition metal.

In the description herein, the metallocene catalyst may be described as a catalyst precursor, a pre-catalyst compound, metallocene catalyst compound or a transition metal compound, and these terms are used interchangeably. An "anionic ligand" is a negatively charged ligand which donates one or more pairs of electrons to a metal ion.

For purposes of the present disclosure, in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

"Alkoxides" include an oxygen atom bonded to an alkyl group that is a $C_1$ to Cm hydrocarbyl. The alkyl group may be straight chain, branched, or cyclic. The alkyl group may be saturated or unsaturated. In at least one embodiment, the alkyl group may comprise at least one aromatic group.

"Asymmetric" as used in connection with the instant indenyl compounds means that the substitutions at the 4 positions are different, or the substitutions at the 2 positions are different, or the substitutions at the 4 positions are different and the substitutions at the 2 positions are different.

The properties and performance of the polyethylene may be advanced by the combination of: (1) varying reactor conditions such as reactor temperature, hydrogen concentration, comonomer concentration, and so on; and (2) selecting and feeding a dual catalyst system having a first catalyst and second catalyst trimmed or not with the first catalyst or the second catalyst.

With respect to at least one embodiment of the catalyst system, the first catalyst is a high molecular weight component and the second catalyst is a low molecular weight component. In other words, the first catalyst may provide primarily for a high molecular-weight portion of the polyethylene and the second catalyst may provide primarily for a low molecular weight portion of the polyethylene. In at least one embodiment, a dual catalyst system is present in a dry catalyst feeder of a reactor system, and a molar ratio of a first catalyst to a second catalyst of the catalyst system is from 99:1 to 1:99, such as from 90:10 to 10:90, such as from 85:15 to 50:50, such as from 75:25 to 50:50, such as from 60:40 to 40:60. The second catalyst can be added to a polymerization process as a trim catalyst to adjust the molar ratio of first catalyst to second catalyst. In at least one embodiment, the first catalyst and the second catalyst are each a metallocene catalyst compound.

Hence, in at least one embodiment, metallocene bis(n propylcyclopentadienyl) Hafnium (IV) dimethyl (also referred to as "HfP"), shown as structure (I) below may be selected as the first catalyst to produce a high molecular weight (HMW) component of the polymer. As used herein, an HMW polymer is a polymer having an Mw value of 110,000 g/mol or greater. In some instances, the first catalyst may be fed in-line to the polymerization reactor. A second catalyst such as the metallocene meso and rac enantiomers of di(1-ethylindenyl) zirconium dimethyl (collectively referred to as EtInd), shown as structures (IIA) and (II-B) below, may be selected to produce a low molecular weight (LMW) component of the polymer. As used herein, an LMW polymer is a polymer having an Mw value of less than 110,000 g/mol. The second catalyst can be included in the same catalyst system as the first catalyst, e.g. may be co-supported with the first catalyst. Some or all of the first catalyst and/or second catalyst may be fed as a trim catalyst to contact the first catalyst (e.g., in-line/on-line) having the first catalyst in route to the polymerization reactor.

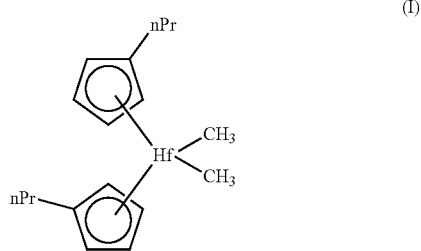

(I)

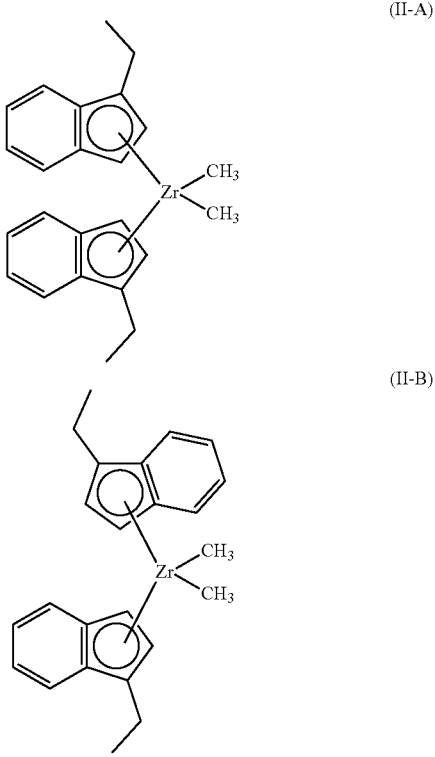

(II-A)

(II-B)

Of course, other metallocene catalysts (or non metallocene catalysts), as described herein, may be selected, and other catalyst system configurations carried out. The appropriate metallocene catalysts selected may depend on the specified properties of the polymer and the desired subsequent applications of the formed polymer resins, such as for pipe applications, packaging, film extrusion and cosmetics, blow-molding, injection molding, rotation molding applications, and so forth. The catalysts selected may include catalysts that promote good (high) or poor (low) incorporation of comonomer (e.g., 1-hexene) into the polyethylene, have a relatively high response to hydrogen concentration in the reactor or a relatively low response to reactor hydrogen concentration, and so forth. As used herein, good/high comonomer incorporation refers to a polyethylene formed by a process of the present disclosure, where the polyethylene has a comonomer content of 7 wt % or greater. As used herein, poor/low comonomer incorporation refers to a polyethylene formed by a process of the present disclosure, where the polyethylene has a comonomer content of less than 7 wt %.

By using structures such as EthInd as the second catalyst trimmed on-line at various ratios to contact the first catalyst such as the first metallocene catalyst Hfp, along with varying reactor conditions involving temperature, reaction mixture component concentrations, and the like, beneficial polyethylene products may be formed. In at least one embodiment, a reverse trim is employed considering the LMW catalyst species EthInd as the first catalyst and the HMW catalyst species HfP as the second catalyst or catalyst trim. Additionally, it should also be contemplated that for the distinct catalysts selected, some of the second catalyst may be initially co-deposited with the first catalyst on a common support, and an additional amount of the second catalyst added as trim.

In at least one embodiment, the amount of first or second catalyst fed (or the catalyst trim ratio), and the reactor conditions (e.g., temperature and hydrogen concentration), may be varied to give a range of MI and MIR while maintaining polyethylene density. The embodiments may advantageously hold a broad range of MI's with the same catalyst system, e.g., the same dual catalyst system. For a catalyst system fed to the polymerization reactor, the polymer MI, MIR, density and CD may be controlled by varying reactor conditions such as the reactor mixture including operating temperature, hydrogen concentration, and comonomer concentration in the reaction mixture.

Table 1 summarizes some example aspects of reactor control with respect to polyethylene properties. For instance, the hydrogen/ethylene ($H_2/C_2$) weight ratio or mole ratio may be an adjustment or control knob or a "primary" adjustment knob, for polyethylene MI adjustment. The comonomer-ethylene (e.g., Comonomer/$C_2$) weight ratio or mole ratio may be an adjustment or control knob or a "primary" adjustment knob, for polyethylene density. The reactor temperature, and the weight or mole ratio of the two catalysts (or the catalyst trim ratio) may be an adjustment or control knob for the polyethylene MIR. Other adjustment and control points are considered. Moreover, a range of MIR values of the polymer can be considered for a given catalyst system used to produce the polymer. Other polymer properties such as density and MI may be calibrated. Furthermore, the techniques for reactor control described herein including the determinants considered in Table 1 may apply to (1) polyethylene product development, (2) direct control of the reactor during the actual production of the polyethylene, (3) targeted formulations development for reactor conditions for (a) various catalyst systems, (b) amounts of catalyst systems, (c) polyethylene grades or products, and so forth.

TABLE 1

| | Reactor Control | | | |
| --- | --- | --- | --- | --- |
| | Catalyst ratio | Temperature | Comonomer/$C_2$ | $H_2/C_2$ |
| MI | | | | X |
| Density | | | X | |
| MIR | X | X | | |

Exemplary ranges of MIR include 10 to 80, such as 15 to 70, such as 20 to 70, such as 20 to 65. Exemplary ranges of MI (grams/10 minutes) include 0.1 to 4 (e.g., for film), 5 to 50 or 5 to 100 (e.g., for molding such as rotational and/or injection molding), and so on. Exemplary ranges for density include 0.915 g/cm$^3$ to 0.935 g/cm$^3$, 0.912 g/cm$^3$ to 0.940 g/cm$^3$, 0.910 g/cm$^3$ to 0.945 g/cm$^3$, and the like.

Herein, at least one embodiment addresses the importance of developing well-controlled techniques for the formation of polyethylene copolymers holding a MWD×CD. Therefore, improving the physical properties of polymers with the tailored MWD×CD can be beneficial for commercially desirable products. Without judiciously tailoring MWD×CD, polyethylene copolymers could display some compromises among the desirable attribute, such as improving stiffness to the detriment of toughness for instance. Control of these properties may be achieved for the most part by the choice of the catalyst system.

In at least one embodiment, reactor temperature may be used as a control variable for MIR adjustment. Subsequently, at the chosen reactor temperature for a starting MIR, a trim-catalyst level may be added to further increase MIR until a pre-set MIR range is reached. The component concentrations in the polymerization mixture, such as hydrogen and comonomer (e.g., ethylene) concentrations may be adjusted for specific MI and density targets of the polyethylene at the given MIR range. The amount of trim catalyst and reactor concentration adjustments may be repeated for various levels of MIR range and specific MI and density targets.

Embodiments demonstrate a novel technology to independently control a polyethylene product's MIR from its MI and density in a single reactor environment. Consequently, some polyethylene products may have a wide range of MWD×CD compositions and product attribute combinations. For instance, some of the polyethylene polymers may have the same or similar nominal MI and density but different MIR and MWD×CD. Other polyethylene polymers in the instances have the same or similar nominal MI (I-2), density, and MIR but are different in MWD×CD. In some of the instances, the MI may range from 0.1 g/10 min to 5.0 g/10 min, such as from 0.5 g/10 min to 1.5 g/10 min, and the density may range from 0.913 g/cm$^3$ to 0.925 g/cm$^3$, or other ranges.

In at least one embodiment, the catalysts may be applied separately in a single-reactor or multiple-reactor polymerization systems. In some other embodiments, the multiple catalysts may be applied on a common support to a given reactor, applied via different supports, and/or utilized in reactor systems having a single polymerization reactor or more than one polymerization reactor, and so forth.

At least one embodiment is related to multiple catalysts, e.g., a first catalyst and a second catalyst, impregnated on a catalyst support for polymerization of monomer into a polymer. A catalyst support impregnated with multiple catalysts may be used to form polymeric materials with improved balance of properties, such as stiffness, environmental stress crack resistance (ESCR), toughness, processability, among others. Controlling the amounts and types of catalysts present on the support contributes to reach this balance. Selection of the catalysts and ratios may adjust the combined MWD of the polymer produced. The MWD can be controlled by combining catalysts giving the desired weight average molecular weight (Mw) and individual molecular weight distributions of the produced polymer. For example, the typical MWD for linear metallocene polymers is 2.5 to 3.5. Blend studies indicate it would be desirable to broaden this distribution by employing mixtures of catalysts that each provides different average molecular weights. The ratio of the Mw for a LMW component and a HMW component would be between 1:1 and 1:10, or about 1:2 and 1:5. When a support is impregnated with multiple catalysts, new polymeric materials with improved balance of stiffness, toughness and processability can be achieved, e.g., by controlling the amounts and types of catalysts present on the support. Appropriate selection of the catalysts and ratios may be used to adjust the MWD, short chain branch distribution (SCBD), and long chain branch distribution (LCBD) of the polymer, for example, to provide a polymer with a broad orthogonal composition distribution (BOCD). The MWD, SCBD, and LCBDs would be controlled by combining catalysts with the appropriate Mw, comonomer incorporation, and long chain branching (LCB) formation under the conditions of the polymerization. Polymers having a BOCD in which the comonomer is incorporated in the HMW chains can lead to improved physical properties, such as processability, stiffness, toughness, ESCR, and so forth. Controlled techniques for forming polyethylene copolymers having a broad orthogonal composition distribution may be beneficial.

A number of catalyst compositions containing single site, e.g., metallocene, catalysts have been used to prepare polyethylene copolymers, producing relatively homogeneous copolymers at good polymerization rates. In contrast to traditional Ziegler-Natta catalyst compositions, single site catalyst compositions, such as metallocene catalysts, are catalytic compounds in which each catalyst molecular structure can produce one or only a few polymerization sites. Single site catalysts often produce polyethylene copolymers that have a narrow molecular weight distribution. Although there are single site catalysts that can produce broader molecular weight distributions, these catalysts often show a narrowing of the molecular weight distribution as the reaction temperature is increased, for example, to increase production rates. Further, a single site catalyst will often incorporate comonomer among the molecules of the polyethylene copolymer at a relatively uniform rate. The MWD and the amount of comonomer incorporation can be used to determine a SCBD. For an ethylene alpha-olefin copolymer, short chain branching (SCB) on a polymer chain is typically created through comonomer incorporation during polymerization. The SCBD refers to the distribution of the short chains (comonomer) along the polymer backbone.

The resin is said to have a "broad SCBD" when the amount of SCB varies among the polyethylene molecules. When the amount of SCB is similar among the polyethylene molecules of different chain lengths, the SCBD is said to be "narrow". SCBD is known to influence the properties of copolymers, such as extractable content stiffness, heat sealing, toughness, environmental stress crack resistance, among others. The MWD and SCBD of a polyolefin is largely dictated by the type of catalyst used and is often invariable for a given catalyst system. Polymers with broad SCBD are in general produced by Ziegler-Natta catalysts and chromium based catalysts, whereas metallocene catalysts normally produce polymers with narrow SCBD.

Using multiple pre-catalysts that are co-supported on a single support mixed with an activator, such as a silica methylaluminoxane (SMAO), can be economically advantageous by making the polymer product in one reactor instead of multiple ones. Additionally, using a single support also eases intimate mixing of the polymers while off improving the process relative to preparing a mixture of polymers of different Mw and density independently from multiple catalysts in a single reactor. As described herein, a pre-catalyst is a catalyst compound prior to exposure to activator. The catalysts can be co-supported during a single operation, or may be used in a trim operation, in which one or more additional catalysts are added to catalysts that are supported.

Evidence of the incorporation of comonomer into a polymer is indicated by the density of a polyethylene copolymer, with lower densities indicating higher incorporation. The difference in the densities of the low molecular weight (LMW) component and the high molecular weight (HMW) component would be greater than about 0.02, or greater than about 0.04, with the HMW component having a lower density than the LMW component. Satisfactory control of the MWD and SCBD lead to the adjustment of these factors, which can be adjusted by tuning the relative amount of the two pre-catalysts on the support. This may be adjusted during the formation of the pre-catalysts, for instance, by supporting two catalysts on a single support. In at least one embodiment, the relative amounts of the pre-catalysts can be adjusted by adding one of the components to a catalyst mixture progressing into the reactor in a process termed "trim". Furthermore, the amount of catalyst addition can be controlled by means of feedback of polymer property data obtained.

Moreover, a variety of polymers with different MWD, SCBD, and LCBD may be prepared from a limited number of catalysts. Indeed, the pre-catalysts should trim well onto activator supports. Two parameters that benefit trimming well are solubility in alkane solvents and rapid supportation on the catalyst slurry en-route to the reactor. This favors the use of MCNs to achieve controlled MWD, SCBD, and LCBD. Techniques for selecting catalysts that can be used to generate targeted molecular weight compositions may be employed.

In at least one embodiment, the mixed catalyst system provides a polymer with a mix of beneficial properties as a result of a tailored combination of MWD and the CD. The ability to control the MWD and the CD of the system is typically crucial in determining the processability and strength of the resultant polymer.

These factors can be tailored by controlling the MWD, which, in turn, can be adjusted by changing the relative amount of the combination of pre-catalysts on the support. This may be regulated during the formation of the pre-catalysts, for instance, by supporting the two, or more, catalysts on a single support. In at least one embodiment, the relative amounts of the pre-catalysts can be adjusted by adding one of the components as trim to a catalyst mixture progressing into the reactor. Controlling the amount of catalyst addition can be achieved by using the feedback of polymer property data.

Altogether, certain embodiments provide a polymerization system, method, and catalyst system for producing polyethylene. The techniques include polymerizing ethylene in the presence of a catalyst system in a reactor to form the polyethylene, wherein the catalyst system has a first catalyst such as metallocene catalyst, and a second catalyst such as another metallocene catalyst or a non-metallocene catalyst. The reactor conditions and an amount of the second catalyst (or ratio of second catalyst to first catalyst) fed to the reactor may be adjusted to control MI and the density of the polyethylene based on a target MIR and a desired combination of MWD and CD. The reactor conditions adjusted may be operating temperature of the reactor, a comonomer concentration and/or hydrogen concentration in the polymerization mixture in the reactor, and the like. The reactant concentrations may be adjusted to meet a MI target and/or density target of the polyethylene, for example, at a given MIR range of the polyethylene. In examples, the MI of the polyethylene is in a range from 0.5 g/10 min to 1.5 g/10 min, and the density of the polyethylene is in a range from 0.916 g/cm$^3$ to 0.930 g/cm$^3$.

In at least one embodiment, the first catalyst includes the metallocene catalyst HfP and the second catalyst is the metallocene EtInd. Further, the catalyst system may be a common supported catalyst system. Furthermore, the second catalyst may be added as a trim catalyst to a slurry having the first catalyst fed the reactor. The first catalyst and the second catalyst may be impregnated on a single support. Furthermore, in certain embodiments, the first catalyst promotes polymerization of the ethylene into a high molecular weight portion of the polyethylene, and the second catalyst promotes polymerization of the ethylene into a low molecular-weight portion of the polyethylene. An amount of the second catalyst fed (or the catalyst trim ratio) to the polymerization reactor may be adjusted along with reactor conditions to control polyolefin properties at a given MIR, for instance.

Other embodiments provide for a method of producing polyethylene, including: polymerizing ethylene in the presence of a catalyst system in a reactor to form polyethylene, where the catalyst system comprises a first catalyst and a second catalyst; and adjusting reactor temperature, reactor hydrogen concentration, and/or an amount of the trim catalyst (e.g., second catalyst) fed to the reactor, to give a range of MIR of the polyethylene while maintaining density and MI of the polyethylene. An initial amount of the second catalyst may be co-deposited with first catalyst prior to being fed to the reactor. The adjusted amount of the second catalyst fed to the reactor may be the catalyst trim ratio. In certain embodiments, the first catalyst promotes polymerization of the ethylene into a high molecular-weight portion of the polyethylene, and wherein the second catalyst promotes polymerization of the ethylene into a low molecular-weight portion of the polyethylene. In particular embodiments, the reactor hydrogen concentration as a ratio of hydrogen to ethylene in the reactor is a control variable for MI, a ratio of comonomer (e.g., 1-hexene) to ethylene in the reactor is a primary control variable for the density, and the reactor temperature and the amount of the second catalyst fed to the reactor as a catalyst trim ratio are primary control variables of the MIR. In some instances, the MIR is in the range of 20 to 70 and the density is in the range of 0.912 g/cm$^3$ to 0.940 g/cm$^3$.

At least one embodiment provides for a method of producing polyethylene, including: polymerizing ethylene in the presence of a catalyst system in a reactor to form polyethylene, wherein the catalyst system comprises a first catalyst and a second catalyst, and adjusting reactor conditions and an amount of the trim catalyst fed to the reactor, to adjust the MI and/or MIR of polymer product.

Assorted catalyst systems and components may be used to generate the polymers. These are discussed in the sections to follow regarding the catalyst compounds that can be used in embodiments, including the first metallocene and the second metallocene catalysts, among others; generating catalyst slurries that may be used for implementing the techniques described; supports that may be used; catalyst activators that may be used; the catalyst component solutions that may be used to add additional catalysts in trim systems; gas-phase polymerization reactor with a trim feed system; use of the catalyst composition to control product properties; polymerization processes.

Catalyst Compounds
Metallocene Catalyst Compounds

Metallocene catalyst compounds can include catalyst compounds having one or more Cp ligands (cyclopentadienyl and ligands isolobal to cyclopentadienyl) bound to at least one Group 3 to Group 12 metal atom, and one or more leaving group(s) bound to the at least one metal atom. As used herein, all references to the Periodic Table of the Elements and groups thereof is to the NEW NOTATION published in HAWLEYS CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopentalacenaphthylenyl, 7-H-dibenzofluorenyl, indeno[1,2,9]anthrene, thiophenoindenyl, thiophenofluorenyl, hydrogenated versions thereof (e.g., 4,5,6,7-tetrahydroindenyl, or "H4 Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment; and selected from the group consisting of Sc, Ti, Zr, Hf, V, Nb, Ta, Mn, Re, Fe, Ru, Os, Co. Rh, Ir, and Ni in yet a more particular exemplary embodiment; and selected from the group consisting of Groups 4, 5, and 6 atoms in yet a more particular exemplary embodiment; and Ti, Zr, Hf atoms in yet a more particular exemplary embodiment; and Zr in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the structure (III):

$$Cp_A Cp_B MX_n \quad \text{(III)},$$

in which M is as described above; each X is chemically bonded to M, each Cp group is chemically bonded to M. and n is 0 or an integer from 1 to 4, and either 1 or 2 in a particular exemplary embodiment.

The ligands represented by $Cp_A$ and $Cp_B$ in structure (III) can be the same or different cyclopentadienyl ligands or ligands isolobal to cyclopentadienyl, either or both of which can contain heteroatoms and either or both of which can be substituted by a group R. In at least one specific embodiment, $Cp_A$ and $Cp_B$ are independently selected from the group consisting of cyclopentadienyl, indenyl, tetrahydroindenyl, fluorenyl, and substituted derivatives of each.

Independently, each $Cp_A$ and $Cp_B$ of structure (III) can be unsubstituted or substituted with any one or combination of substituent groups R. Non-limiting examples of substituent groups R as used in structure (III) as well as ring substituents in structures discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with any of the catalyst structures of the present disclosure (e.g., formula (III)) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary butyl, isopropyl, and the like. Other possible radicals include substituted alkyls and aryls such as, for example, fluoromethyl, fluroethyl, difluroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris (trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated Substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R Such as 1-butanyl can form a bonding association to the element M.

Each leaving group, or X, in the structure (III) (and X of the catalyst structures shown below) is independently selected from halogen, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; chloride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls), in yet a more particular exemplary embodiment.

Other non-limiting examples of X groups include amides, amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)$ O—), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one exemplary embodiment, two or more X's form a part of a fused ring or ring system. In at least one specific embodiment, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of structure (III) where $Cp_A$ and $Cp_B$ are bridged to each other by at least one bridging group, (A) such that the structure is represented by structure (IV):

These bridged compounds represented by structure (IV) are known as "bridged metallocenes." The elements $Cp_A$, $Cp_B$, M, X and n in structure (IV) are as defined above for structure (III); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl, or aryl substituted to satisfy neutral valency. In at least one specific embodiment, the bridging group (A) can also include substituent groups R as defined above (for structure (III)) including halogen radicals and iron. In at least one specific embodiment, the bridging group (A) can be represented by $C_1$ to $C_6$ alkylenes, substituted $C_1$ to $C_6$ alkylenes, oxygen, sulfur, $R_2C=R_2Si$, —$Si(R')_2Si(OR')_2$—, $R'_2Ge$—, and RP=, where "=" represents two chemical bonds, R is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In at least one specific embodiment, the bridged metallocene catalyst compound of structure (IV) includes two or more bridging groups (A). In one or more embodiments, (A) can be a divalent bridging group bound to both $Cp_A$ and $Cp_B$ selected from divalent $C_1$ to $C_{20}$ hydrocarbyls and $C_1$ to $C_{20}$ heteroatom containing hydrocarbonyls, where the heteroatom containing hydrocarbonyls include from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl cyclohexylphenylsilyl, t-butylcyclohexylsilyl, di(t-butylphenyl) silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N, and O. Non-limiting examples of ring structures which can be present as, or as part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be cis-, trans-, or a combination thereof.

The cyclic bridging groups (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular exemplary embodiment) such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms. The ligands $Cp_A$ and $Cp_B$ of structure (III) and (IV) can be different from each other. The ligands $Cp_A$ and $Cp_B$ of structure (III) and (IV) can be the same. The metallocene catalyst compound can include bridged mono ligand metallocene compounds (e.g., mono cyclopentadienyl catalyst components).

It is considered that the metallocene catalyst components discussed and described above include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso-isomer does not, itself, constitute at least two different bridged, metallocene catalyst components.

The amount of the transition metal component of the one or more metallocene catalyst compounds in the catalyst system can range from 0.2 wt %, 0.3 wt %, 0.5 wt %, or 0.7 wt % to 1 wt %, 2 wt %, 2.5 wt %, 3 wt %, 3.5 wt %, or 4 wt %, based on the total weight of the catalyst system.

The metallocene catalyst compounds can include any suitable combination.

For example, the metallocene catalyst compound can include, but is not limited to, bis(n-butylcyclopentadienyl) zirconium $(CH_3)_2$, bis(n-butylcyclopentadienyl)$ZrCl_2$, bis (n-butylcyclopentadienyl)$ZrCl_2$, (n-propylcyclopentadienyl, tetramethylcyclopentadienyl)$ZrCl_2$, or any combinations thereof. Other metallocene catalyst compounds are contemplated.

Although the catalyst compounds may be written or shown with methyl-, chloro-, or phenyl-leaving groups attached to the central metal, it can be understood that these groups may be different. For example, each of these ligands may independently be a benzyl group (Bn), a methyl group (Me), a chloro group (Cl), a fluoro group (F), or any number of other groups, including organic groups, or heteroatom groups. Further, these ligands will change during the reaction, as a pre-catalyst is converted to the active catalyst for the reaction.

Catalyst Component Dry-Feed

A catalyst component of the present disclosure can be initially present in a dry catalyst feeder, as described in more detail below, and is introduced from the dry catalyst feeder into a line as a "dry-feed". As used herein, "dry-feed" includes a composition comprising a contact product of at least one catalyst, a support, and optional activator, and the composition is substantially free of carrier fluid. Carrier fluid is the liquid/oil component of a catalyst stream before contact with the trim solution.

The catalyst system may include a catalyst component, which may have an initial catalyst compound, and an added solution catalyst component that is added to the slurry. Generally, the first metallocene catalyst and/or second metallocene catalyst will be supported in the initial dry-feed. However, in at least one embodiment, the initial catalyst component slurry may have no catalysts. In this case, two or more solution catalysts may be included in the composition to cause each to be supported. The solvent of the solution(s) is then removed (e.g., by vacuum and/or nitrogen purging), and the catalyst system is dried. The dried catalyst system can then be added to a dry catalyst feeder, and the dry catalyst feeder can be coupled with a line that is coupled with a reactor, such as a gas-phase polymerization reactor.

Any number of suitable combinations of catalyst components may be used in embodiments. For example, the catalyst component dry-feed can include an activator and a support, or a supported activator. Further, the dry-feed can include a catalyst compound in addition to the activator and the support. As noted, the catalyst compound in the dry-feed may be supported.

The dry-feed may include one or more activators and supports, and one or more catalyst compounds. For example, the dry-feed may include two or more activators (such as alumoxane and a modified alumoxane) and a catalyst compound, or the dry-feed may include a supported activator and more than one catalyst compounds. In at least one embodiment, the dry-feed includes a support, an activator, and two catalyst compounds. In another embodiment the dry-feed includes a support, an activator and two different catalyst compounds, which may be added to the slurry separately or in combination. The dry-feed, containing silica and alumoxane, may be contacted with a catalyst compound, allowed to react, and thereafter the dry-feed is contacted with another catalyst compound, for example, in a trim system.

The molar ratio of metal in the activator to metal in the catalyst compound in the dry-feed may be 1000:1 to 0.5:1, 300:1 to 1:1, 100:1 to 1:1, or 150:1 to 1:1. The dry-feed can include a support material which may be any inert particulate carrier material known in the art, including, but not limited to, silica, fumed silica, alumina, clay, talc or other support materials such as disclosed above. In at least one embodiment, the dry-feed contains silica and an activator, such as methyl aluminoxane ("MAO"), modified methyl aluminoxane ("MMAO), as discussed further below.

One or more diluents or carriers can be used to facilitate the combination of any two or more components of the catalyst system to form a slurry or in the trim catalyst solution. For example, the single site catalyst compound and the activator can be combined together in the presence of toluene or another non-reactive hydrocarbon or hydrocarbon mixture to provide the catalyst mixture. In addition to toluene, other suitable diluents can include, but are not limited to, ethylbenzene, xylene, pentane, hexane, heptane, octane, other hydrocarbons, or any combination thereof. The support, either dry or mixed with toluene, can then be added to the catalyst mixture or the catalyst/activator mixture can be added to the support. As noted above, to form a dry-feed of the present disclosure, the solvent of the slurry is removed (e.g., by vacuum and/or nitrogen purging), and the catalyst system is dried. The dried catalyst system can then be added to a dry catalyst feeder, and the dry catalyst feeder can be coupled with a line that is coupled with a reactor, such as a gas-phase polymerization reactor. The dried catalyst system is introduced to the line as a dry-feed.

Support

As used herein, the terms "support" and "carrier" are used interchangeably and refer to any support material, including a porous support material, such as talc, inorganic oxides, and inorganic chlorides. The one or more single site catalyst compounds of the dry-feed can be supported on the same or separate supports together with the activator, or the activator can be used in an unsupported form, or can be deposited on a support different from the single site catalyst compounds, or any combination thereof. This may be accomplished by any technique commonly used in the art. There are various other suitable methods for supporting a single site catalyst compound. For example, the single site catalyst compound can contain a polymer bound ligand. The single site catalyst compounds of the dry-feed can be spray dried. The support used with the single site catalyst compound can be functionalized.

The support can be or include one or more inorganic oxides, for example, of Group 2, 3, 4, 5, 13, or 14 elements. The inorganic oxide can include, but is not limited to silica, alumina, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include silica, alumina, or a combination thereof. In at least one embodiment described herein, the support is silica.

Suitable commercially available silica supports can include, but are not limited to, ES757, ES70, and ES70W available from PQ Corporation. Suitable commercially available silica-alumina Supports can include, but are not limited to, SIRAL® 1, SIRAL® 5, SIRAL® 10, SIRAL® 20, SIRAL® 28M, SIRAL® 30, and SIRAL® 40, available from SASOL®. Generally, catalyst supports comprising silica gels with activators, such as methylaluminoxanes (MAOs), are used in the trim systems described, since these supports may function better for co-supporting solution carried catalysts.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, $H^+$, $[H(OEt_2)_2]^+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Activator

As used herein, the term "activator" may refer to any compound or combination of compounds, supported, or unsupported, which can activate a single site catalyst compound or component. Such as by creating a cationic species of the catalyst component. For example, this can include the abstraction of at least one leaving group (the 'X' group in the single site catalyst compounds described herein) from the metal center of the single site catalyst compound/component. The activator may also be referred to as a "co-catalyst". For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be described as oligomeric aluminum compounds having Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or disobutylaluminum hydride. Examples of trialkylaluminum compounds include, but are not limited to, trimethylaluminum, triethylaluminum (TEAL), triisobutylaluminum TiBAl), tri-n-hexylaluminum, tri-n-octylaluminum, tripropylaluminum, tributylaluminum, and the like.

Catalyst Component Solution (the "Trim Solution")

The catalyst component solution may include only catalyst compound(s), such as a metallocene, or may include an activator. In at least one embodiment, the catalyst compound(s) in the catalyst component solution is unsupported. The catalyst solution used in the trim process can be prepared by dissolving the catalyst compound and optional activators in a liquid solvent. The liquid solvent may be an alkane, such as a $C_5$ to $C_{30}$ alkane, or a $C_5$ to $C_{10}$ alkane, such as isopentane or isohexane. Cyclic alkanes such as cyclohexane and aromatic compounds such as toluene may also be used. Mineral oil may be used as a solvent alternatively or in addition to other alkanes such as a $C_5$ to $C_{30}$ alkane. Mineral oil can have a density of from 0.85 g/cm³ to 0.9 g/cm³ at 25° C. according to ASTM D4052, such as from 0.86 g/cm³ to 0.88 g/cm³. Mineral oil can have a kinematic viscosity at 25° C. of from 150 cSt to 200 cSt according to ASTM D341, such as from 160 cSt to 190 cSt, such as about 170 cSt. Mineral oil can have an average molecular weight of from 400 g/mol to 600 g/mol according to ASTM D2502, such as from 450 g/mol to 550 g/mol, such as about 500 g/mol. In at least one embodiment, a mineral oil is HYDROBRITE® 380 PO White Mineral Oil ("HB380") from Sonneborn, LLC.

In at least one embodiment, the liquid utilized in the catalyst compound solution is different from the diluent used to form the catalyst component slurry (which is then dried to form the dry-feed).

If the catalyst solution includes both activator and catalyst compound, the ratio of metal in the activator to metal in the catalyst compound in the solution may be 1000:1 to 0.5:1, 300:1 to 1:1, or 150:1 to 1:1. In various embodiments, the activator and catalyst compound are present in the solution at up to about 90 wt %, at up to about 50 wt %, at up to about 20 wt %, such as at up to about 10 wt %, at up to about 5 wt %, at less than 1 wt %, or between 100 ppm and 1 wt %, based upon the weight of the solvent and the activator or catalyst compound.

The catalyst component solution can include any one of the catalyst compound(s) of the present disclosure. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing dry-feed(s) described above. In addition, more than one catalyst component solution may be utilized.

Continuity Additive/Static Control Agent

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxylated amines, and anti-static compositions such as those provided by Innospec Inc. under the trade name OCTASTAT. For example, OCTASTAT 2000 is a mixture of a polysulfone copolymer, a polymeric polyamine, and oil soluble sulfonic acid.

Any of the mentioned control agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc) family of products).

In at least one embodiment, other useful continuity additives may include ethyleneimine additives such as polyethyleneimines having the following general formula: —($CH_2$—$CH_2$—NH)n-, where n may be from about 10 to about 10,000. The polyethyleneimines may be linear, branched, or hyper branched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —($CH_2$—$CH_2$—NH)n- may be used as the polyethyleneimine, materials having primary, secondary, and tertiary branches can also be used. Commercial polyethyleneimine can be a compound having branches of the ethyleneimine polymer.

Gas Phase Polymerization Reactor

FIG. 1 is a schematic of a gas-phase reactor system 100, showing the addition of at least two catalysts, at least one of which is added as a trim catalyst. The catalyst component dry-feed including at least one support and at least one activator, and at least one catalyst compound (such as two different catalyst compounds) may be placed in a vessel or dry catalyst feeder 102.

Dry catalyst feeder 102 can be any suitable dry catalyst feeder configured to provide dry supported catalyst to a line (such as piping 130 or piping 140). A suitable dry catalyst feeder, for example, can be those shown in U.S. Pat. Nos. 3,779,712, 5,209,607, and U.S. Pub. No. 2002/0034464, which are incorporated by reference. An inert gas, such as nitrogen or argon, is provided to the dry catalyst feeder to increase pressure in the dry catalyst feeder and force the dry catalyst into the line. Dry catalyst feeder 102 does not require agitation because the dry-feed is not a slurry and, therefore, there is no settling of a slurry in the dry catalyst feeder. Furthermore, because there is no slurry in the feeder, there is also typically no foaming, and elevating the temperature of the dry catalyst feeder to reduce foaming is typically not performed.

A catalyst component solution, prepared by mixing a solvent and at least one catalyst compound and/or activator, is placed in another vessel, such as a trim pot 104. Trim pot 104 can have a volume of from about 100 gallons to 2,000 gallons, such as from 100 gallons to 1,500 gallons, such as from 200 gallons to 1,000 gallons, such as from 200 gallons to 500 gallons, for example about 300 gallons.

A catalyst component solution, prepared by mixing a solvent and at least one catalyst compound and/or activator, is placed in another vessel, such as a trim pot 104. Trim pot 104 can have a volume of from about 100 gallons to 2,000 gallons, such as from 100 gallons to 1,500 gallons, such as from 200 gallons to 1,000 gallons, such as from 200 gallons to 500 gallons, for example about 300 gallons. Trim pot 104 can be maintained at an elevated temperature, such as from 30° C. to 75° C., such as from 40° C. to 45° C., for example about 43° C. or about 60° C. Elevated temperature can be obtained by electrically heat tracing trim pot 104 using, for example, a heating blanket.

The catalyst component dry feed can then be combined in-line with the catalyst component solution to form a final catalyst composition. A nucleating agent 106, such as silica, alumina, fumed silica or any other particulate matter may be added to the solution in-line or in the trim pot 104. Nonetheless, because a dry catalyst feed is already a supported catalyst, addition of a nucleating agent to the dry-feed is merely optional. Similarly, additional activators or catalyst compounds may be added in-line. For example, a second catalyst dry-feed that includes a different catalyst may be introduced from a second dry catalyst feeder. The two catalyst dry-feeds may be used as the catalyst system with or without the addition of a solution catalyst from the trim pot.

The catalyst component dry-feed and solution can be mixed in-line to form a slurry. For example, the solution and dry-feed may be mixed by utilizing a static mixer 108 or an agitating vessel. The mixing of the catalyst component dry-feed and the catalyst component solution should be long enough to allow the catalyst compound in the catalyst component solution to disperse in the catalyst component slurry such that the catalyst component, originally in the solution, migrates to the supported activator originally present in the dry-feed. The combination forms a uniform dispersion of catalyst compounds on the supported activator forming the catalyst composition (e.g., a slurry). The length of time that the slurry and the solution are contacted is typically up to about 220 minutes, such as about 1 to about 60 minutes, about 5 to about 40 minutes, or about 10 to about 30 minutes.

In at least one embodiment, static mixer 108 of gas-phase reactor system 100 is maintained at an elevated temperature, such as from 30° C. to 75° C., such as from 40° C. to 45° C., for example about 43° C. or about 60° C. Elevated temperature can be obtained by electrically heat tracing static mixer 108 using, for example, a heating blanket. Maintaining static mixer 108 at an elevated temperature can promote mixing of the catalyst component dry-feed and catalyst solution (as compared to lower temperatures) which reduces run times in the static mixer and for the overall polymerization process. However, because foaming does not occur using a dry-feed catalyst (as compared to a slurry catalyst feed), maintaining an elevated temperature of static mixer 108 is merely optional and mixing can be performed at ambient temperature (e.g., 20° C. to 25° C.).

When combining the catalysts, the activator and the optional support or additional co-catalysts in the hydrocarbon solvents immediately prior to a polymerization reactor, the combination can yield a new polymerization catalyst in less than 1 h, less than 30 min, or less than 15 min Shorter times are more effective, as the new catalyst is ready before being introduced into the reactor, which can provide faster flow rates.

In another embodiment, an aluminum alkyl, an ethoxylated aluminum alkyl, an aluminoxane, an anti-static agent or a borate activator, such as a $C_1$ to $C_{15}$ alkyl aluminum (for example tri-isobutyl aluminum, trimethyl aluminum or the like), a $C_1$ to $C_{15}$ ethoxylated alkyl aluminum or methyl aluminoxane, ethyl aluminoxane, isobutylaluminoxane, modified aluminoxane or the like are added to the mixture of the dry-feed and the solution in line. The alkyls, antistatic agents, borate activators and/or aluminoxanes may be added from an alkyl vessel 110 directly to the combination of the solution and the dry-feed, or may be added via an additional alkane (such as hexane, heptane, and or octane) carrier stream, for example, from a carrier vessel 112. The additional alkyls, antistatic agents, borate activators and/or aluminoxanes may be present at up to 500 ppm, at 1 ppm to 300 ppm, at 10 ppm to 300 ppm, or at 10 ppm to 100 ppm. A carrier gas 114 such as nitrogen, argon, ethane, propane, and the like, may be added in-line to the mixture of the dry-feed and the solution. Typically the carrier gas may be added at the rate of about 1 to about 100 lb/hr (0.4 to 45 kg/hr), or about 1 to about 50 lb/hr (5 to 23 kg/hr), or about 1 to about 25 lb/hr (0.4 to 11 kg/hr). In at least one embodiment, the dry-feed is delivered in-line by timed catalyst injections and contacted with a carrier gas that is dry $N_2$. A 20 ft coil of tubing can be used to provide mixing time.

In at least one embodiment, a liquid carrier stream is introduced into the line that has dry-feed. Liquid carrier stream can be provided from a carrier vessel, such as carrier vessel 112 of FIG. 1. The mixture of the dry-feed and the liquid carrier stream may pass through a mixer or length of tube for mixing before being contacted with a gaseous carrier stream. It has been discovered that providing a liquid carrier stream to a dry-feed in-line increases the catalyst efficiency. Without being bound by theory, the liquid carrier stream (such as iC5) can vaporize in-line which cools the slurry and provides an increase in catalyst efficiency. Similarly, a comonomer 116, such as hexene, another alpha-olefin, or diolefin, may be added in-line to the dry-feed.

Alternatively, in at least one embodiment, a liquid carrier stream is introduced into the combination of the solution and dry-feed. Liquid carrier stream can be provided from a carrier vessel, such as carrier vessel 112 of FIG. 1. The mixture of the solution, the dry-feed and the liquid carrier stream may pass through a mixer or length of tube for mixing before being contacted with a gaseous carrier stream. Similarly, a comonomer 116, such as hexene, another alpha-olefin, or diolefin, may be added in-line to the mixture of the dry-feed and the solution.

In at least one embodiment, a gas stream 126, such as cycle gas, or re-cycle gas 124, monomer, nitrogen, or other materials is introduced into an injection nozzle 300 having a support tube 128 that surrounds an injection tube 120. The dry-feed/solution mixture is passed through the injection tube 120 to a reactor 122. In at least one embodiment, the injection tube may aerosolize the dry-feed/solution mixture. Any number of suitable tubing sizes and configurations may be used to aerosolize and/or inject the dry-feed/solution mixture.

Figure 2:
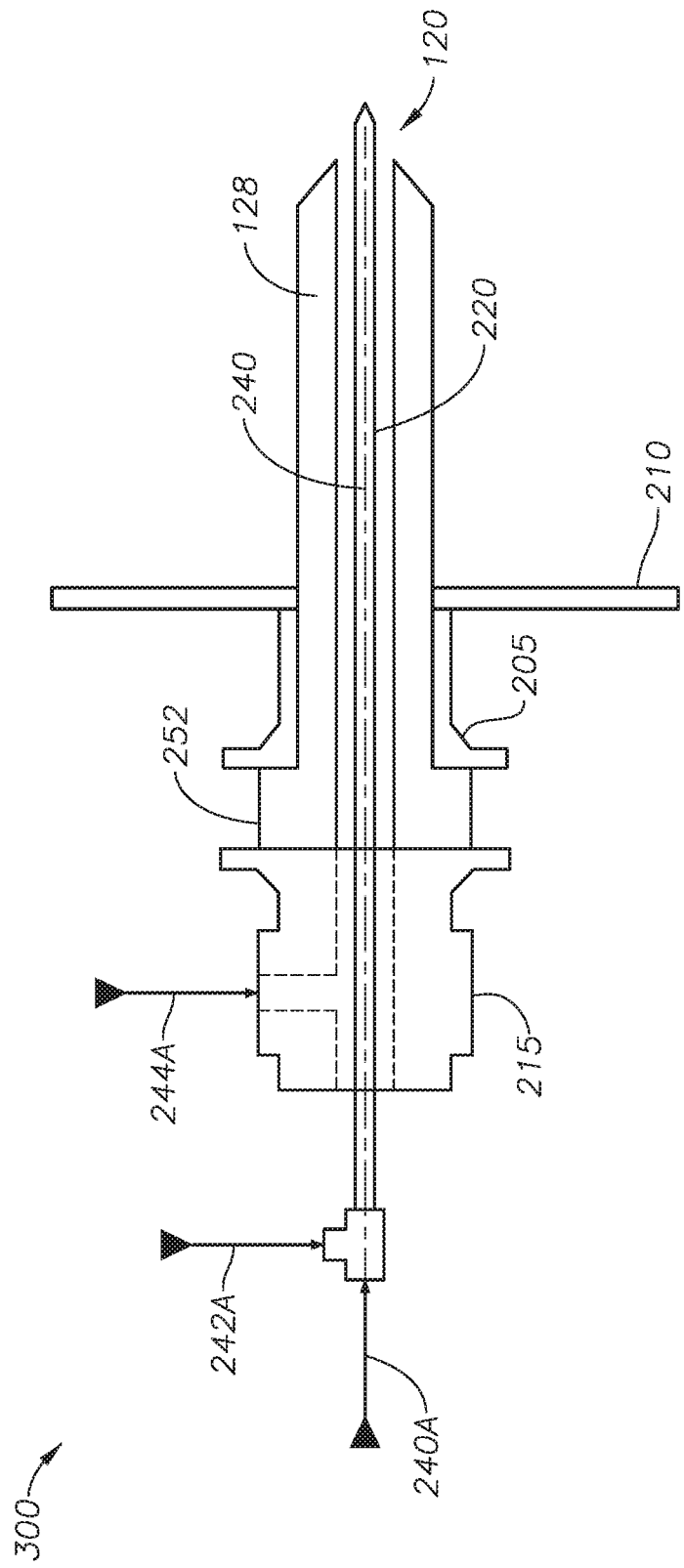
FIG. 2 is a schematic of a nozzle, according to one embodiment.

In at least one embodiment, nozzle 300 is an "effervescent" nozzle. It has been discovered that use of an effervescent nozzle can provide a 3-fold increase or more in nozzle efficiency of a trim process as compared to conventional trim process nozzles. FIG. 2 is a schematic diagram of one embodiment of nozzle 300. As shown in FIG. 2, injection nozzle 300 is in fluid communication with one or more feed lines (three are shown in FIG. 2) 240A, 242A, 244A. Each feed line 240A, 242A, 244A provides an independent flow path for one or more monomers, purge gases, catalyst and/or catalyst systems to any one or more of the conduits 220 and 240. Feed line 242A provides the feed provided by piping 140 (shown in FIG. 1), and feed lines 240A and 244A independently provide feeds from piping of a similar or same apparatus, such as the trim feed apparatus of FIG. 1. Alternatively, feed lines 240A, 242A, and 244A independently provide catalyst dry-feed, catalyst component solution, liquid carrier stream, monomer, or comonomer.

Feed line ("first feed line") 240A can be in fluid communication with an annulus defined by the inner surface of the first conduit 220 and the outer surface of the second conduit 240. In one or more embodiments, a feed line ("second feed line") 242A provides the feed provided by piping 140 (shown in FIG. 1) and can be in fluid communication with an annulus within the second conduit 240. A feed line ("third feed line") 244A can be in fluid communication with an annulus defined by the inner surface of the support member 128 and the outer surface of the first conduit 220.

Any of the one or more catalyst or catalyst systems, purge gases, and monomers can be injected into any of the one or more feed lines 240A, 242A, 244A. The one or more catalyst or catalyst systems can be injected into the first conduit 220 using the first feed line 242A ("catalyst feed line"). The one or more purge gases or inert gases can be injected into the second conduit 240 using the second feed line 240A ("purge gas feed line"). The one or more monomers can be injected into the support member 128 using the third feed line 244A ("monomer feed line"). The feed lines 240A, 242A, 244A can be any conduit capable of transporting a fluid therein. Suitable conduits can include tubing, flex hose, and pipe. A three way valve 215 can be used to introduce and control the flow of the components (i.e. catalyst dry-feed, purge gas and monomer) to the injection nozzle 300. Any suitable commercially available three way valve can be used.

Support member 128 can include a first end having a flanged section 252. The support member 128 can also include a second end that is open to allow a fluid to flow there through. In one or more embodiments, support member 128 is secured to a reactor wall 210. In one or more embodiments, flanged section 252 can be adapted to mate or abut up against a flanged portion 205 of the reactor wall 210 as shown.

In one or more embodiments, at least a portion of the support member 128 has a tapered outer diameter. The second end ("open end") of support member 128 can be tapered to reduce the wall thickness at the tip of the support member 128, Minimizing the area at the tip of support member 128 helps prevent fouling. Fouling can be caused due to agglomerate formation of polymer on a nozzle, a concept referred to as "pineappling". A suitable effervescent nozzle for at least one embodiment of the present disclosure is shown in U.S. Patent Pub. No. 2010/0041841 A1, which is incorporated herein by reference in its entirety.

As shown in FIG. 2, support member 128 is a tubular or annular member. Support member 128 can have an inner diameter large enough to surround first conduit 220. The monomer flow, such as through feed line 244A and or through support tube 128, can be from 50 kg/hr to 1,150 kg/hr, such as from 100 kg/hr to 950 kg/hr, such as from 100 kg/hr to 500 kg/hr, such as from 100 kg/hr to 300 kg/hr, such as from 180 kg/hr to 270 kg/hr, such as from 150 kg/hr to 250 kg/hr, for example about 180 kg/hr. These flow rates can be achieved by a support tube, such as support tube 128, having a diameter of from ¼ inch to ¾ inch, for example about ½ inch. A diameter of from ¼ inch to ¾ inch has been discovered to provide reduced flow rates as compared to conventional trim process flow rates (e.g., 1,200 kg/hr), which further provides reduced overall amounts of liquid carrier (such as iC5) and nitrogen used during a polymerization process.

An effervescent nozzle as described herein can further provide control of slurry e.g., dry-feed+carrier fluid and optional catalyst component solution) droplet size into a reactor as a function of gas velocity and not liquid velocity, which allows a desired droplet size to be achieved by adjusting, for example, the carrier gas flow rate (e.g., 114 of FIG. 1) while allowing a range of carrier vessel (e.g., 112 of FIG. 1) to be utilized during a polymerization process. For example, in at least one embodiment, methods of the present disclosure can provide a ratio of supported catalyst particles per droplet of carrier fluid of from 1:1 to 10:1, such as 5:1, which can provide reduced overall amounts of liquid carrier (such as iC5) used during a trim polymerization process, as compared to a conventional trim catalyst particle to droplet ratio of 1:1. In at least one embodiment, a carrier gas flow rate is from 1 kg/hr to 50 kg/hr, such as from 1 kg/hr to 25 kg/hr, such as from 2 kg/hr to 20 kg/hr, such as from 2.5 kg/hr to 15 kg/hr. In at least one embodiment, a carrier fluid flow rate is from 1 kg/hr to 100 kg/hr, such as from 5 kg/hr to 50 kg/hr, such as from 5 kg/hr to 30 kg/hr, such as from 10 kg/hr to 25 kg/hr, for example about 15 kg/hr.

In at least one embodiment, a plurality of effervescent nozzles (not shown) is coupled with a reactor. For example, two or more effervescent nozzles are coupled with a reactor, and the flow rate of slurry from each nozzle is less than if only one effervescent nozzle were coupled with the reactor. In at least one embodiment, a flow rate of slurry from two effervescent nozzles is about 11 kg/hr from each of the nozzles. An additional nozzle (e.g., a third nozzle) can also be coupled with the reactor and can remain inactive (e.g., offline) until one of the first two nozzles becomes inactive. In at least one embodiment, each effervescent nozzle (e.g., all three nozzles) is active (e.g., online) during a polymerization process. Each component (e.g., catalyst slurry from one dry catalyst feeder 102) can be fed to the nozzles using a catalyst flow splitter. A suitable catalyst flow splitter is described in U.S. Pat. No. 7,980,264, which is incorporated herein by reference in its entirety.

Returning to FIG. 1, to promote formation of particles in the reactor 122, a nucleating agent 118, such as fumed silica, can be added directly into the reactor 122. Conventional trim polymerization processes involve a nucleating agent introduced into a polymerization reactor. However, processes of the present disclosure have provided advantages such that addition of a nucleating agent (such as spray dried fumed silica) to the reactor is merely optional. For embodiments of processes of the present disclosure that do not include a nucleating agent, it has been discovered that a high polymer bulk density (e.g., 0.4 g/cm$^3$ or greater) can be obtained, which is greater than the bulk density of polymers formed by conventional trim processes. Furthermore, when a metallocene catalyst or other similar catalyst is used in the gas phase reactor, oxygen or fluorobenzene can be added to the reactor 122 directly or to the gas stream 126 to control the polymerization rate. Thus, when a metallocene catalyst (which is sensitive to oxygen or fluorobenzene) is used in combination with another catalyst (that is not sensitive to oxygen) in a gas phase reactor, oxygen can be used to modify the metallocene polymerization rate relative to the polymerization rate of the other catalyst. An example of such a catalyst combination is bis(n-propylcyclopentadienyl) zirconium dichloride and [(2,4,6-Me$_3$C$_6$H$_2$)NHCH$_2$CH$_2$]$_2$NHZrBn$_2$, where Me is methyl or bis(indenyl)zirconium dichloride and [(2,4,6-Me$_3$C$_6$H$_2$)NHCH$_2$CH$_2$]$_2$NHHfBn$_2$, where Me is methyl. For example, if the oxygen concentration in the nitrogen feed is altered from 0.1 ppm to 0.5 ppm, significantly less polymer from the bisindenyl ZrCl$_2$ will be produced and the relative amount of polymer produced from the [(2,4,6-Me$_3$C$_6$H$_2$)NHCH$_2$CH$_2$]$_2$NHHfBn$_2$ is increased. WO 1996/009328 discloses the addition of water or carbon dioxide to gas phase polymerization reactors, for example, for similar purposes.

The example above is not limiting, as additional solutions and dry-feeds may be included. For example, a dry-feed can be combined with two or more solutions having the same or different catalyst compounds and or activators. Likewise, the solution may be combined with two or more dry-feeds each having the same or different supports, and the same or different catalyst compounds and or activators. Similarly, two or more dry-feeds combined with two or more solutions, for example in-line, where the dry-feeds each comprise the same or different supports and may comprise the same or different catalyst compounds and or activators and the solutions comprise the same or different catalyst compounds and or activators. For example, the dry-feed may contain a supported activator and two different catalyst compounds, and two solutions, each containing one of the catalysts in the dry-feed, and each are independently combined, in-line, with the dry-feed.

Use of Catalyst Composition to Control Product Properties

The properties of the product polymer may be controlled by adjusting the timing, temperature, concentrations, and sequence of the mixing of the solution, the dry-feed and any optional added materials (nucleating agents, catalyst compounds, activators, etc.) described above. The MWD, MI, density, MIR, relative amount of polymer produced by each catalyst, and other properties of the polymer produced may also be changed by manipulating process parameters. Any number of process parameters may be adjusted, including manipulating hydrogen concentration in the polymerization system, changing the amount of the first catalyst in the polymerization system, or changing the amount of the second catalyst in the polymerization system. Other process parameters that can be adjusted include changing the relative ratio of the catalysts in the polymerization process (and optionally adjusting their individual feed rates to maintain a steady or constant polymer production rate). The concentrations of reactants in the reactor 122 can be adjusted by changing the amount of liquid or gas that is withdrawn or purged from the process, changing the amount and/or composition of a recovered liquid and/or recovered gas returned to the polymerization process, wherein the recovered liquid or recovered gas can be recovered from polymer discharged from the polymerization process. Further process parameters including concentration parameters that can be adjusted include changing the polymerization temperature, changing the ethylene partial pressure in the polymerization process, changing the ethylene to comonomer ratio in the polymerization process, changing the activator to transition metal ratio in the activation sequence. Time dependent parameters may be adjusted such as changing the relative feed rates of the dry-feed or solution, changing the mixing time, the temperature and or degree of mixing of the dry-feed and the solution in-line, adding different types of activator compounds to the polymerization process, and or adding oxygen or fluorobenzene or other catalyst poison to the polymerization process. Any combinations of these adjustments may be used to control the properties of the final polymer product.

In at least one embodiment, the MWD of the polymer product is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The MWD may be measured by size exclusion chromatography (SEC), e.g., gel permeation chromatography (GPC), among other techniques.

In at least one embodiment, a polymer product property is measured in-line and in response the ratio of the catalysts being combined is altered. In at least one embodiment, the molar ratio of the catalyst compound in the catalyst component dry-feed to the catalyst compound in the catalyst component solution, after the dry-feed and solution have been mixed to form the final catalyst composition, is 500:1 to 1:500, or 100:1 to 1:100, or 50:1 to 1:50 or 40:1 to 1:10. In another embodiment, the molar ratio of a Group 15 catalyst compound in the dry-feed to a metallocene catalyst compound in the solution, after the dry-feed and solution have been mixed to form the catalyst composition, is 500:1, 100:1, 50:1, 10:1, or 5:1. The product property measured can include the dynamic shear viscosity, flow index, melt index, density, MWD, comonomer content, and combinations thereof. In another embodiment, when the ratio of the catalyst compounds is altered, the introduction rate of the catalyst composition to the reactor, or other process parameters, is altered to maintain a desired production rate.

Polymerization Process

The catalyst system can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to a catalyst addition system that are similar to those discussed with respect to FIG. 1 and FIG. 2 can be used. For example, a trim system may be used to feed catalyst to a loop slurry reactor for polyethylene copolymer production.

The terms "polyethylene" and "polyethylene copolymer" refer to a polymer having at least 50 wt % ethylene derived units. In various embodiments, the polyethylene can have at least 70 wt % ethylene-derived units, at least 80 wt % ethylene-derived units, at least 90 wt % ethylene-derived units, or at least 95 wt % ethylene-derived units. The polyethylene polymers described herein are generally copolymer, but may also include terpolymers, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Referring again to FIG. 1, the reactor 122 can include a reaction zone 132 and a velocity reduction zone 134. The reaction zone 132 can include a bed 136 that includes growing polymer particles, formed polymer particles and a minor amount of catalyst particles fluidized by the continuous flow of the gaseous monomer and diluent to remove heat of polymerization through the reaction zone. Optionally, some of the recycle gas 124 can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone 132 can be passed to the velocity reduction zone 134 where entrained particles are removed, for example, by slowing and falling back to the reaction zone 132. If desired, finer entrained particles and dust can be removed in a separation system 138, such as a cyclone and/or fines filter. The recycle gas 124 can be passed through a heat exchanger 144 where at least a portion of the heat of polymerization can be removed. The gas can then be compressed in a compressor 142 and returned to the reaction zone 132. Alternately, compressor 142 can be located upstream (not shown) of heat exchanger 144. Additional reactor details and means for operating the reactor 122 are described in, for example, U.S.

Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluid bed process can be greater than 30° C., such as greater than 40° C., such as greater than 50° C., such as greater than 90° C., such as greater than 100° C., such as greater than 110° C., such as greater than 120° C., such as greater than 150° C., or higher. In general, the reactor temperature is operated at a suitable temperature taking into account the sintering temperature of the polymer product within the reactor. Thus, the upper temperature limit in at least one embodiment is the melting temperature of the polyethylene copolymer produced in the reactor. However, higher temperatures may result in narrower MWDs, which can be improved by the addition of a catalyst, or other co-catalysts, as described herein.

Hydrogen gas can be used in olefin polymerization to control the final properties of the polyolefin, such as described in the "Polypropylene Handbook, at pages 76-78 (Hanser Publishers, 1996). Using certain catalyst systems, increasing concentrations (partial pressures) of hydrogen can increase a flow index such as MI of the polyethylene copolymer generated. The MI can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be an amount necessary to achieve the desired MI of the final polyolefin polymer. For example, the mole ratio of hydrogen to total monomer ($H_2$:monomer) can be 0.0001 or greater, 0.0005 or greater, or 0.001 or greater. Further, the mole ratio of hydrogen to total monomer ($H_2$:monomer) can be 10 or less, 5 or less, 3 or less, or 0.10 or less. A range for the mole ratio of hydrogen to monomer can include any combination of any upper mole ratio limit with any lower mole ratio limit described herein. The amount of hydrogen in the reactor at any time can range to up to 5,000 ppm, up to 4,000 ppm in another embodiment, up to 3,000 ppm, or from 50 ppm to 5,000 ppm, or from 50 ppm to 2,000 ppm in another embodiment. The amount of hydrogen in the reactor can range from 1 ppm, 50 ppm, or 100 ppm to 400 ppm, 800 ppm, 1,000 ppm, 1,500 ppm, or 2,000 ppm, based on weight. Further, the ratio of hydrogen to total monomer ($H_2$:monomer) can be 0.00001:1 to 2:1, 0.005:1 to 1.5:1, or 0.0001:1 to 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The gas phase reactor can be capable of producing from 10 kg of polymer per hour (25 lbs/hr) to 90,900 kg/hr (200,000 lbs/hr), or greater, and greater than 455 kg/hr (1,000 lbs/hr), greater than 4.540 kg/hr (10,000 lbs/hr), greater than 11,300 kg/hr (25,000 lbs/hr), greater than 15,900 kg/hr (35,000 lbs/hr), and greater than 22,700 kg/hr (50,000 lbs/hr), and from 29,000 kg/hr (65,000 lbs/hr) to 45,500 kg/hr (100,000 lbs/hr).

As noted, a slurry polymerization process can also be used in embodiments. A slurry polymerization process generally uses pressures in the range of from 101 kPa (1 atmosphere) to 5,070 kPa (50 atmospheres) or greater, and temperatures from 0° C. to 120° C., and more particularly from 30° C. to 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In at least one embodiment, a hexane, isopentane $iC_5$, or isobutene $iC_4$ medium can be employed. The slurry can be circulated in a continuous loop system.

A number of tests can be used to compare resins from different sources, catalyst systems, and manufacturers. Such tests can include melt index, high load melt index, melt index ratio, density, die swell, environmental stress crack resistance, among others.

The product polyethylene can have a melt index ratio (MIR) ranging from 10 to less than 300, or, in some embodiments, from 20 to 66. The melt index (MI, $I_2$) can be measured in accordance with ASTM D-1238.

Density can be determined in accordance with ASTM D-792. Density is expressed as grams per cubic centimeter (g/cm$^3$) unless otherwise noted. The polyethylene can have a density ranging from 0.89 g/cm$^3$, 0.90 g/cm$^3$, or 0.91 g/cm$^3$ to 0.95 g/cm$^3$, 0.96 g/cm$^3$, or 0.97 g/cm$^3$. The polyethylene can have a bulk density, measured in accordance with ASTM D-1895 method B, of from 0.25 g/cm$^3$ to 0.5 g/cm$^3$. For example, the bulk density of the polyethylene can range from 0.30 g/cm$^3$, 0.32 g/cm$^3$, or 0.33 g/cm$^3$ to 0.40 g/cm$^3$, 0.44 g/cm$^3$, or 0.48 g/cm$^3$.

In embodiments herein, the present disclosure provides polymerization processes where monomer (such as propylene or ethylene), and optionally comonomer, are contacted with a catalyst system comprising an activator and at least one catalyst compound, as described above. The catalyst compound and activator may be combined in any order, and are combined typically prior to contacting with the monomer.

In at least one embodiment, a polymerization process includes a) contacting one or more olefin monomers with a catalyst system comprising: i) an activator and ii) a catalyst compound of the present disclosure. The activator is a non-coordination anion activator. The one or more olefin monomers may be propylene and/or ethylene and the polymerization process further comprises heating the one or more olefin monomers and the catalyst system to 70° C. or more to form propylene polymers or ethylene polymers, such as propylene polymers.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises propylene and one or more optional comonomers selected from propylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises propylene and an optional comonomer that is one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include propylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein (in other words, the polymer has diene residues) at up to 10 wt %, such as at 0.00001 to 1.0 wt %, such as 0.002 to 0.5 wt %, such as 0.003 to 0.2 wt %, based upon the total weight of the composition. In at least one embodiment 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Diene monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diene monomers can be selected from alpha, omega-diene monomers (i.e. di-vinyl monomers). The diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In at least one embodiment, a catalyst of the present disclosure is capable of producing ethylene polymers having an Mw from 40,000 g/mol to 1,500,000 g/mol, such as from 70,000 g/mol to 1,000,000 g/mol, such as from 90,000 g/mol to 1,000,000 g/mol, such as from 100,000 g/mol to 600,000 g/mol, such as from 100,000 g/mol to 300,000 g/mol, such as from 100,000 g/mol to 200,000 g/mol.

In at least one embodiment, a catalyst of the present disclosure is capable of producing ethylene polymers having a melt index (MI) of 0.6 or greater g/10 min, such as 0.7 or greater g/10 min, such as 0.8 or greater g/10 min, such as 0.9 or greater g/10 min, such as 1.0 or greater g/10 min, such as 1.1 or greater g/10 min, such as 1.2 or greater g/10 min.

In at least one embodiment, the productivity of the catalyst system of a polymerization of the present disclosure is at least 50 g(polymer)/g(cat)/hour, such as 500 or more g(polymer)/g(cat)/hour, such as 800 or more g(polymer)/g(cat)/hour, such as 5,000 or more g(polymer)/g(cat)/hour, such as 6,000 or more g(polymer)/g(cat)/hour.

Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

End Uses

The multi-modal polyolefin produced by the processes disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other typical polyethylene applications.

In one aspect of the present disclosure, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In at least one embodiment, the second ethylene polymers are made by the catalysts, activators and processes described in U.S. Pat. Nos. 6,342,566; 6,384,142; 5,741,563; PCT publications WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

In at least one embodiment, the cycle gas loop and feed gases are fed into the reactor body through a perforated distributor plate and the slurry process is carried out continuously in a reactor. The catalyst, as a slurry in isopentane (iC$_5$) or as a dry free flowing powder, is injected regularly to the reactor, which contains a fluidized bed of growing polymer particles fluidized with the circulating cycle gas containing monomer, optional comonomer, and isopentane (iC5) with other inerts such as nitrogen.

Hydrogen, optionally, may be added as a molecular weight control.

In at least one embodiment, hydrogen is added from 50 ppm to 500 ppm, such as from 150 ppm to 450 ppm, such as from 250 ppm to 400 ppm, such as from 350 ppm to 400 ppm. The reactor may be maintained at a pressure of 2,000 kPa to 5,000 kPa and at a temperature of from about 60° C. to about 120° C. depending on the desired polymer melting characteristics.

In at least one embodiment, the polymerization: 1) is conducted at temperatures of from 10° C. to 300° C., such as from 25° C. to 150° C., such as from 40° C. to 120° C., such as from 70° C. to 110° C., such as from 85° C. to 100° C.); 2) is conducted at a pressure of atmospheric pressure of 150 psig or greater, such as 200 psig or greater, such as 250 psig or greater, such as 300 psig or greater; 3) is conducted in an aliphatic hydrocarbon solvent (which is in gas phase during gas phase polymerization); (aliphatic hydrocarbon solvent can be isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, where aromatics are present in the solvent at less than 1 wt %, such as at less than 0.5 wt %, such as at 0 wt % based upon the weight of the solvents); and 4) the activity of the catalyst compound is at least 5,000 gP/gCat or greater, such as at least 6,000 gP/gCat or greater, such as at least 7,000 gP/gCat or greater, such as at least 8,000 gP/gCat or greater.

In at least one embodiment, the reactor is maintained at a pressure of 2,068 kPa (300 psi) and at a temperature of 85° C. (185° F.).

In at least one embodiment, the reactor temperature is maintained at 85° C. throughout the polymerization by controlling the temperature of the cycle gas loop.

A process to produce ethylene polymer compositions can include one or more of: i) contacting in a single reaction zone, in the gas phase or slurry phase, ethylene and C$_3$ to C$_{20}$ comonomer with a catalyst system comprising a support, an activator, and the catalyst system described above, and obtaining an ethylene polymer with a density of 0.92 g/cm$^3$ or greater, a MIR of about 44.0 or greater, an MI of 1.70 g/10 min and a catalyst activity of 7,000 gP/gCat or greater.

In at least one embodiment, a method of producing polyethylene includes: polymerizing ethylene in the presence of a catalyst system in a reactor to form polyethylene, wherein the catalyst system comprises a first catalyst and a second catalyst, and adjusting reactor conditions and an amount of the second catalyst fed to the reactor, to take in a range of MI.

In at least one embodiment, the supported catalyst ratio of first catalyst:second catalyst is present at a molar ratio of at least 90:10, such as at least 80:20, such as at least 70:30, such as at least 60:40, such as at least 50:50.

In at least one embodiment, a polymer of the present disclosure has a MI of 0.95 or greater g/10 min, such as 0.97 or greater g/10 min, such as 1.0 or greater g/10 min, such as 1.2 or greater g/10 min, such as 1.5 or greater g/10 min, such as 1.7 or greater g/10 min.

In at least one embodiment, the polymer of the present disclosure has a HLMI of 20 or greater g/10 min, such as 25 or greater g/10 min, such as 50 or greater g/10 min, such as 75 or greater g/10 min, such as 90 or greater g/10 min Additional Aspects The present disclosure provides, among others, the following aspects, each of which may be considered as optionally including any alternate aspects.

Clause 1. A method for producing a polyolefin comprising:
contacting a dry-feed composition and a solution composition in a line to form a slurry composition, the dry-feed composition comprising a contact product of a first catalyst, a second catalyst, a support, and a first activator, and the solution composition comprising a contact product of an activator, a diluent, and the first catalyst or the second catalyst;
introducing a carrier gas to the line;
introducing the slurry composition from the line into a gas-phase fluidized bed reactor;
exposing the slurry composition to polymerization conditions; and
obtaining a polyolefin.

Clause 2. The method of Clause 1, wherein the carrier gas is selected from nitrogen, argon, ethane, propane, and mixtures thereof.

Clause 3. The method of Clauses 1 or 2, wherein the carrier gas is nitrogen.

Clause 4. The method of any of Clauses 1 to 3, wherein the carrier gas is introduced at a rate of from 0.4 kg/hr to 45 kg/hr.

Clause 5. The method of any of Clauses 1 to 4, wherein the diluent is an alkane.

Clause 6. The method of any of Clauses 1 to 5, wherein the diluent is isopentane or isohexane.

Clause 7. The method of any of Clauses 1 to 6, wherein the solution composition is free of a support.

Clause 8. The method of any of Clauses 1 to 7, wherein the dry-feed composition is free of a nucleating agent.

Clause 9. The method of any of Clauses 1 to 8, further comprising mixing the slurry composition in a static mixer or agitated vessel before introducing the slurry composition to the reactor.

Clause 10. The method of Clause 10, wherein mixing the slurry composition in a static mixer is performed at ambient temperature.

Clause 11. The method of any of Clauses 1 to 10, wherein introducing the slurry composition into the gas-phase fluidized bed reactor comprises passing the slurry composition through a nozzle, the nozzle comprising:
a first annulus defined by an inner surface of a first conduit and an outer surface of a second conduit;
a second annulus within the second conduit; and
a third annulus defined by an inner surface of a support member and an outer surface of the first conduit.

Clause 12. The method of Clause 11, wherein the support member has a tapered outer diameter.

Clause 13. The method of Clauses 11 or 12, wherein the support member is a tube having a diameter of from ¼ inch to ¾ inch.

Clause 14. The method of any of Clauses 11 to 13, further comprising providing ethylene to the nozzle at a flow rate of from 100 kg/hr to 300 kg/hr.

Clause 15. The method of any of Clauses 11 to 14, further comprising providing the carrier gas to the nozzle at a flow rate of from 2 kg/hr to 20 kg/hr.

Clause 16. The method of any of Clauses 11 to 15, further comprising providing a carrier fluid to the nozzle at a flow rate of from 10 kg/hr to 25 kg/hr.

Clause 17. The method of any of Clauses 1 to 16, wherein the support is a silica support.

Clause 18. The method of any of Clauses 1 to 17, wherein the activator of the first composition and the second composition is an aluminoxane.

Clause 19. The method of any of Clauses 1 to 18, wherein the first catalyst is bis(n-propylcyclopentadienyl) hafnium (IV) dimethyl and the second catalyst is di(1-ethylindenyl) zirconium dimethyl.

Clause 20. The method of any of Clauses 1 to 19, wherein the polyolefin has a density of from 0.913 g/cm$^3$ to 0.925 g/cm$^3$.

Clause 21. The method of any of Clauses 1 to 20, wherein:
the carrier gas is nitrogen, and
the diluent is isopentane or isohexane.

Clause 22. The method of any of Clauses 1 to 21, wherein the dry-feed composition is free of a nucleating agent, and the method further comprises mixing the slurry composition in a static mixer or agitated vessel before introducing the slurry composition to the reactor.

Clause 23. The method of any of Clauses 1 to 22, wherein mixing the slurry composition in a static mixer is performed at ambient temperature.

Clause 24. The method of any of Clauses 1 to 23, wherein introducing the slurry composition into the gas-phase fluidized bed reactor comprises passing the slurry composition through a nozzle, the nozzle comprising:
a first annulus defined by an inner surface of a first conduit and an outer surface of a second conduit;
a second annulus within the second conduit; and
a third annulus defined by an inner surface of a support member and an outer surface of the first conduit,
wherein the support member has a tapered outer diameter and the support member is a tube having a diameter of from ¼ inch to ¾ inch,
wherein the method further comprises:
providing ethylene to the nozzle at a flow rate of from 100 kg/hr to 300 kg/hr,
providing the carrier gas to the nozzle at a flow rate of from 2 kg/hr to 20 kg/hr, and
providing a carrier fluid to the nozzle at a flow rate of from 10 kg/hr to 25 kg/hr.

Clause 25. The method of any of Clauses 1 to 24, wherein:
the support is a silica support,
the activator of the first composition and the second composition is an aluminoxane,
the first catalyst is bis(n-propylcyclopentadienyl) hafnium (IV) dimethyl and the second catalyst is di(1-ethylindenyl) zirconium dimethyl, and
the polyolefin has a density of from 0.913 g/cm$^3$ to 0.925 g/cm$^3$.

Experimental

All reactions were carried out under a purified nitrogen atmosphere using standard glovebox, high vacuum or Schlenk techniques, in a CELSTIR reactor unless otherwise noted. All solvents used were anhydrous, de-oxygenated and purified according to known procedures. All starting materials were either purchased from Aldrich and purified prior to use or prepared according to procedures known to those skilled in the art. Silica was obtained from PQ Corporation, Conshohocken, Pennsylvania. MAO was obtained as a 30 wt % MAO in toluene solution from Albemarle (e.g., 13.6 wt % Al or 5.04 mmol/g). Deuterated solvents were obtained from Cambridge Isotope Laboratories (Andover, MA) and dried over 3 Å molecular sieves. All $^1$H NMR data were collected on a Bruker AVANCE III 400 MHz spectrometer running Topspin™ 3.0 software at room temperature (RT) using tetrachloroethane-d$_2$ as a solvent (chemical shift of 5.98 ppm was used as a reference) for all materials.

Slurry and solvent liquid ratios are given as weight ratios relative to the starting silica material, e.g., raw silica or silica supported MAO and/or catalyst. For example, if it is stated "the silica was slurried in 5× toluene," it means that the silica was slurried in 5 g of toluene for every 1 g of silica.

ES-70™ silica was purchased from PQ Corporation, Conshohocken, Pennsylvania. HYDROBRITE® 380 was purchased from Sonneborn, LLC.

Formation of Supported Catalysts SMAO:

Methylalumoxane treated silica was prepared in a manner similar to the following: In a 4 L stirred vessel in a drybox methylalumoxane (MAO, 30 wt % in toluene, 925 g) was added along with 1400 g of toluene. This solution was then stirred at 60 RPM for 5 minutes. Next, 734 g of ES-70™ silica that has been calcined at 875° C. (see below) was added to the vessel. This slurry is then heated at 100° C. and stirred at 120 RPM for 3 hours. The temperature is then reduced to 25° C. and cooled to ambient temperature.

Bis-n-propylcyclopentadienide hafnium (IV) dimethyl (11.12 g, 27.00 mmol) and bis-ethylindenyl zirconium (IV) dimethyl (1.22 g, 3.00 mmol) were then dissolved in toluene (250 g) and added to the vessel containing the supported MAO slurry/mixture previously prepared, and the mixture was stirred for two more hours. The mixing speed was then reduced and stirred slowly while drying under vacuum for 60 hours, after which 1021 g of light yellow silica with a catalyst ratio of HfP:EtInd (90:10) was obtained.

Polymerization

A pilot plant trial was carried out. Polymerization was performed in an 18.5 foot (5.64 meters) tall gas-phase fluidized bed reactor with a 10 foot (3.05 meters) body and an 8.5 foot (2.6 meters) expanded section. Cycle and feed gases were fed into the reactor body through a perforated distributor plate, and the reactor was controlled at 300 psi and 70 mol % ethylene. The reactor temperature was maintained at 185° F. (85° C.) throughout the polymerization by controlling the temperature of the cycle gas loop. The temperature was used to improve the flowability since the reaction occurred without solvent. Furthermore, the temperature was used as a parameter to modify the viscosity of the reaction mixture. The dry catalyst was delivered by timed catalyst injections into a dry N$_2$ sweep at a ratio of HfP:EtInd (90:10). A 20 ft coil of tubing was used to provide mixing time, but this may be varied in the future to provide optimized trim efficiency. No activator was added to the trim. The results obtained for the ethylene-hexene polymerization in 18.5 foot reactor are illustrated in Table 2 in which the experiment was divided in four steps:

Step 1: Condition 1, Catalyst was fed dry using the normal feeder system where no supplemental iC5 or trim was added, and the catalyst line was the catalyst and its N$_2$ carrier gas.

Step 2: Condition 2, Catalyst was fed with iC$_5$ carrier and no trim catalyst added.

Step 3: Condition 3, Catalyst was fed with increased iC$_5$ carrier volume and the trim catalyst was added.

Step 4: Condition 4, Catalyst was fed with increased iC$_5$ carrier volume and no trim catalyst added.

In the first step, dry catalyst was fed through the feed system according to normal operation (Table 2, Condition 1) with the equipment modifications defined above in service. iC$_5$ was initially isolated so that only dry catalyst was fed to the reactor. After a baseline collection, iC$_5$ was added to the feed line to create an in-line slurry (Table 2, Condition 2). Adding the iC$_5$ resulted in a 25% increase in catalyst activity with no changes to product. The time between catalyst injections was increased from 34 to 44 seconds between shots to maintain a constant production rate. After the reactor reached steady state operation with the in-line slurry, EtInd trim (1 wt % in iC$_5$) was added to the iC$_5$ line. Initially, no changes in product or process conditions were observed. Additional iC$_5$ carrier was added to maintain liquid phase contact between the trim solution and catalyst in the feed line (Table 2, Condition 3). The reaction started consuming more hydrogen, which is an early indication of catalyst ratio adjustment, and the produced polymer increased in density, MI, and HLMI/MI ratio consistent with a larger contribution of EtInd. After collection of a sample, the catalyst trim solution was stopped while the increased iC$_5$ flow continued (Table 2, Condition 4). MI and density decreased to original values from condition of Condition 1, but the HLMI/MI ratio remained slightly higher due to increased iC$_5$ concentration in the reactor. These results indicate that it is possible to modify catalyst ratios as a dry-feed in-line, providing a method to introduce trim technology to our current catalyst manufacturing and feed technology.

Interestingly, the polymerizations of Condition 1, Condition 2, Condition 3, and Condition 4 did not "cake" and did not plug the line.

Overall, the present disclosure provides dry-feed trim polymerization processes which can provide controllable polymer properties, improved trim processes, and reduced amounts of volatiles (e.g., iC$_5$).

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not

TABLE 2

Ethylene-Hexene Polymerization in an 18.5 foot tall gas-phase fluidized bed reactor

| Run Condition # | Condition 1 | Condition 2 | Condition 3 | Condition 4 |
|---|---|---|---|---|
| Catalyst # | HfP:EtInd (90:10) | HfP:EtInd (90:10) | HfP:EtInd (90:10) | HfP:EtInd (90:10) |
| Trim | — | — | EtInd | — |
| Start Date | Day 1 | Day 3 | Day 4 | Day 5 |
| Start Time | 1300 | 100 | 900 | 1700 |
| Finish Date | Day 1 | Day 3 | Day 4 | Day 5 |
| Finish Time | 2100 | 700 | 1300 | 1900 |
| PROCESS DATA | | | | |
| H$_2$ conc. (ppm) | 371 | 369 | 396 | 373 |
| Hydrogen flow (mlb/hr) | 7.30 | 7.19 | 14.10 | 8.11 |
| C$_6$/C$_2$ Ratio (mol %/mol %) | 0.015 | 0.014 | 0.013 | 0.016 |
| Comonomer conc. (mol %) | 1.06 | 0.97 | 0.91 | 1.11 |
| C$_2$ conc. (mol %) | 70.1 | 69.9 | 70.5 | 70.2 |
| Comonomer/C2 Flow Ratio | 0.074 | 0.074 | 0.074 | 0.074 |
| C$_2$ flow (lb/hr) | 121 | 116 | 119 | 116 |
| H$_2$/C$_2$ Ratio (ppm/mol %) | 5.3 | 5.3 | 5.6 | 5.3 |
| Rx. Pressure SP (psig) | 300 | 300 | 300 | 300 |
| Reactor Temp SP (° F.) | 185 | 185 | 185 | 185 |
| Avg. Bedweight (lb) | 358 | 358 | 360 | 359 |
| Production (lb/hr) | 77 | 74 | 70 | 69 |
| Residence Time (hr) | 4.7 | 4.8 | 5.1 | 5.2 |
| C$_2$ Utilization (lbC$_2$/lbC$_2$ poly) | 1.58 | 1.57 | 1.69 | 1.68 |
| Avg Velocity (ft/s) | 2.25 | 2.25 | 2.25 | 2.25 |
| Catalyst Feed (Secs/Shot) | 34.0 | 44.0 | 44.0 | 44.0 |
| Cat Activity (g poly/g cat) | 5792 | 7239 | 6847 | 6750 |
| Product Data | | | | |
| Melt Index (MI) | 1.03 | 0.97 | 1.70 | 0.98 |
| HLMI | 22.30 | 21.62 | 76.02 | 24.77 |
| HLMI/MI Ratio | 21.73 | 22.36 | 44.72 | 25.33 |
| Gradient Density(g/cm$^3$) | 0.9190 | 0.9196 | 0.9283 | 0.9204 |
| Bulk Density(g/cm$^3$) | 0.4374 | 0.4483 | 0.4700 | 0.4678 | explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

We claim:

1. A method for producing a polyolefin comprising:
   contacting a dry-feed composition and a solution composition in a line to form a slurry composition, the dry-feed composition comprising a contact product of a first catalyst, a second catalyst, a support, and a first activator, and the solution composition comprising a contact product of an activator, a diluent, and the first catalyst or the second catalyst;
   introducing a carrier gas to the line;
   introducing the slurry composition from the line into a gas-phase fluidized bed reactor;
   exposing the slurry composition to polymerization conditions; and
   obtaining a polyolefin.

2. The method of claim 1, wherein the carrier gas is selected from nitrogen, argon, ethane, propane, or mixtures thereof.

3. The method of claim 1, wherein the carrier gas is nitrogen.

4. The method of claim 3, wherein the carrier gas is introduced at a rate of from 0.4 kg/hr to 45 kg/hr.

5. The method of claim 1, wherein the diluent is an alkane.

6. The method of claim 5, wherein the diluent is isopentane or isohexane.

7. The method of claim 1, wherein the solution composition is free of a support.

8. The method of claim 1, wherein the dry-feed composition is free of a nucleating agent.

9. The method of claim 8, further comprising mixing the slurry composition in a static mixer or agitated vessel before introducing the slurry composition into the gas-phase fluidized bed reactor.

10. The method of claim 9, wherein mixing the slurry composition in a static mixer is performed at ambient temperature.

11. The method of claim 1, wherein introducing the slurry composition into the gas-phase fluidized bed reactor comprises passing the slurry composition through a nozzle, the nozzle comprising:
    a first annulus defined by an inner surface of a first conduit and an outer surface of a second conduit;
    a second annulus within the second conduit; and
    a third annulus defined by an inner surface of a support member and an outer surface of the first conduit.

12. The method of claim 11, wherein the support member has a tapered outer diameter.

13. The method of claim 11, further comprising one or more of the following:
    (a) providing ethylene to the nozzle at a flow rate of from 100 to 300 kg/hr;
    (b) providing the carrier gas to the nozzle at a flow rate of from 2 to 20 kg/hr; and
    (c) providing a carrier fluid to the nozzle at a flow rate of from 10 to 25 kg/hr.

14. The method of claim 1, wherein the support is a silica support.

15. The method of claim 1, wherein the activator of each of the dry-feed composition and the solution composition is an aluminoxane.

16. The method of claim 1, wherein the first catalyst is bis(n-propylcyclopentadienyl) hafnium (IV) dimethyl and the second catalyst is bis(1-ethylindenyl) zirconium dimethyl.

17. The method of claim 1, wherein the polyolefin has a density of from 0.913 g/cm$^3$ to 0.925 g/cm$^3$.

18. The method of claim 1, wherein:
    the carrier gas is nitrogen, and
    the diluent is isopentane or isohexane.

19. The method of claim 1, wherein introducing the slurry composition into the gas-phase fluidized bed reactor comprises passing the slurry composition through a nozzle, the nozzle comprising:
    a first annulus defined by an inner surface of a first conduit and an outer surface of a second conduit;
    a second annulus within the second conduit; and
    a third annulus defined by an inner surface of a support member and an outer surface of the first conduit,
    wherein the support member has a tapered outer diameter and the support member is a tube having a diameter of from ¼ inch to ¾ inch,
    wherein the method further comprises:
        providing ethylene to the nozzle at a flow rate of from 100 kg/hr to 300 kg/hr,
        providing the carrier gas to the nozzle at a flow rate of from 2 kg/hr to 20 kg/hr, and
    providing a carrier fluid to the nozzle at a flow rate of from 10 kg/hr to 25 kg/hr.

20. The method of claim 1, wherein:
    the support is a silica support,
    the activator of each of the dry-feed composition and the solution composition is an aluminoxane,
    the first catalyst is bis(n-propylcyclopentadienyl) hafnium (IV) dimethyl and the second catalyst is bis(1-ethylindenyl) zirconium dimethyl, and the polyolefin has a density of from 0.913 g/cm$^3$ to 0.925 g/cm$^3$.

* * * * *